(12) United States Patent
Watanabe

(10) Patent No.: US 10,753,731 B2
(45) Date of Patent: Aug. 25, 2020

(54) THREE-DIMENSIONAL FORM MEASUREMENT DEVICE

(71) Applicant: OLYMPUS CORPORATION, Hachioji-shi, Tokyo (JP)

(72) Inventor: Daichi Watanabe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/165,948

(22) Filed: Oct. 19, 2018

(65) Prior Publication Data
US 2019/0049237 A1    Feb. 14, 2019

Related U.S. Application Data

(63) Continuation of application No. PCT/JP2016/062756, filed on Apr. 22, 2016.

(51) Int. Cl.
*G01B 11/24* (2006.01)
*G01B 11/25* (2006.01)

(52) U.S. Cl.
CPC ...... *G01B 11/2441* (2013.01); *G01B 11/2527* (2013.01)

(58) Field of Classification Search
CPC .................. G01B 11/2441; G01B 11/2527
See application file for complete search history.

(56) References Cited

U.S. PATENT DOCUMENTS

| 2004/0070767 A1* | 4/2004 | Tobiason | G01B 9/02056 356/495 |
| 2004/0080754 A1* | 4/2004 | Tobiason | G01B 9/02056 356/495 |
| 2008/0259348 A1 | 10/2008 | Judell et al. | |

(Continued)

FOREIGN PATENT DOCUMENTS

| JP | 05087543 A | 4/1993 |
| JP | 05211988 A | 8/1993 |

(Continued)

OTHER PUBLICATIONS

International Preliminary Report on Patentability (IPRP) (and English language translation thereof) and Written Opinion dated Jul. 12, 2016 issued in International Application No. PCT/JP2016/062756.

(Continued)

*Primary Examiner* — Dominic J Bologna
(74) *Attorney, Agent, or Firm* — Holtz, Holtz & Volek PC

(57) ABSTRACT

A three-dimensional form measurement device includes: an interference fringe projector that scans an interference fringe and projects one of a plurality of interference fringe patterns; an imaging device that images the subject of measurement onto which the interference fringe is projected and generates a plurality of interference fringe images corresponding to at least three different interference fringe patterns in each of a plurality of imaging conditions; and a controller that selects, for each pixel, which imaging condition should be used to compute a phase distribution image of the subject of measurement, and computes a phase of each pixel in the phase distribution image based on the pixel values in the plurality of interference fringe images corresponding to the imaging condition selected for each pixel.

17 Claims, 13 Drawing Sheets

(56) References Cited

U.S. PATENT DOCUMENTS

| | | | | |
|---|---|---|---|---|
| 2010/0225927 A1* | 9/2010 | Dillon | .................. | A61B 5/0084 |
| | | | | 356/511 |
| 2011/0298896 A1* | 12/2011 | Dillon | .................... | G02B 27/48 |
| | | | | 348/46 |
| 2012/0236318 A1* | 9/2012 | Aoki | .................... | G01B 11/245 |
| | | | | 356/613 |

FOREIGN PATENT DOCUMENTS

| | | | |
|---|---|---|---|
| JP | 07280535 | A | 10/1995 |
| JP | 2003519786 | A | 6/2003 |
| JP | 2004138617 | A | 5/2004 |
| JP | 2005214653 | A | 8/2005 |
| JP | 2010243438 | A | 10/2010 |
| JP | 2012518791 | A | 8/2012 |
| JP | 2015135276 | A | 7/2015 |

OTHER PUBLICATIONS

International Search Report (ISR) (and English language translation thereof) dated Jul. 12, 2016 issued in International Application No. PCT/JP2016/062756.

Swanson, et al., "High-precision surface profiling with broadband accordion fringe interferometry", Proceedings of SPIE, Feb. 12, 2001, vol. 4189, pp. 161-169.

Japanese Office Action (and English language translation thereof) dated Jan. 28, 2020 issued in Japanese Application No. 2018-512741.

* cited by examiner

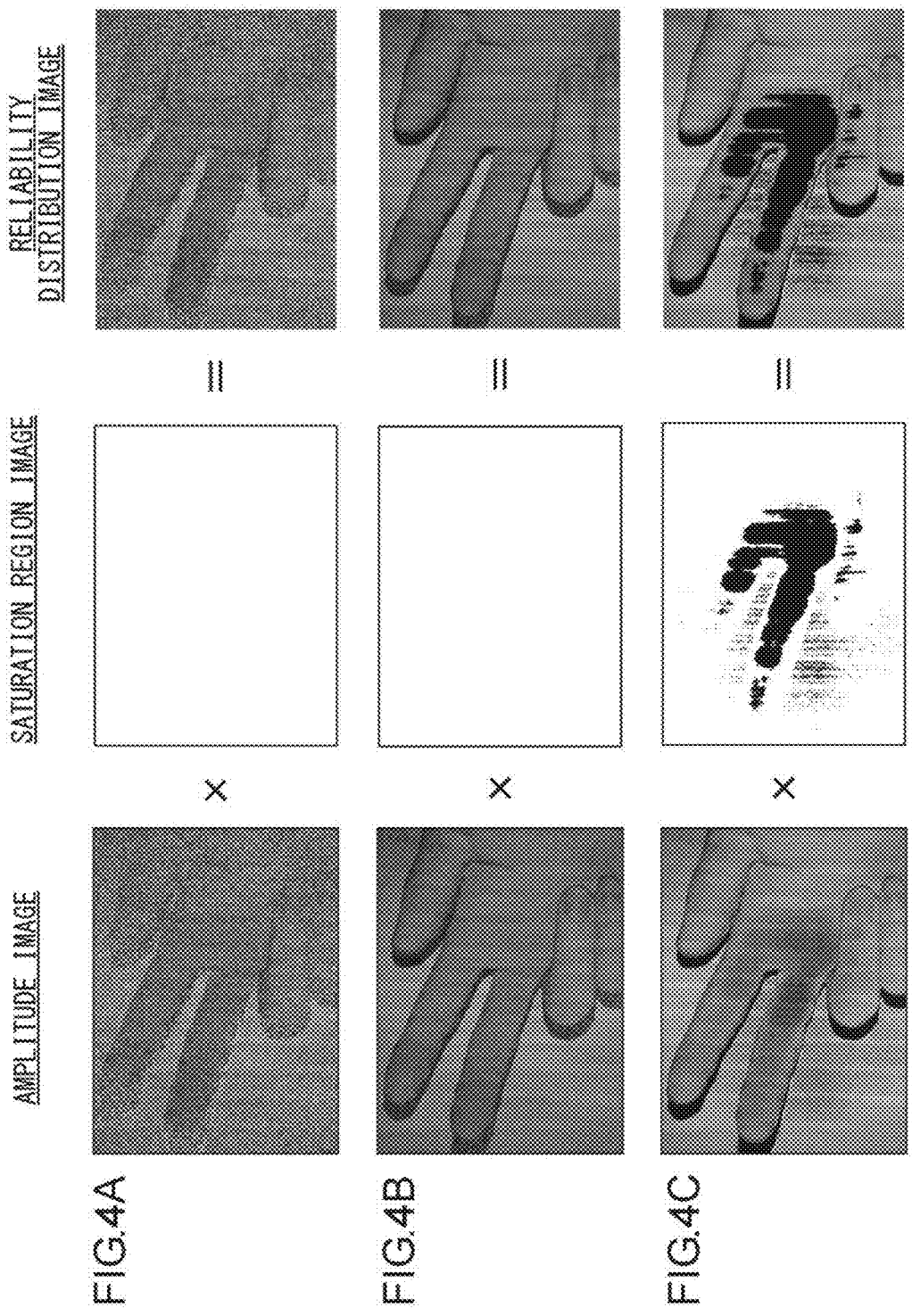

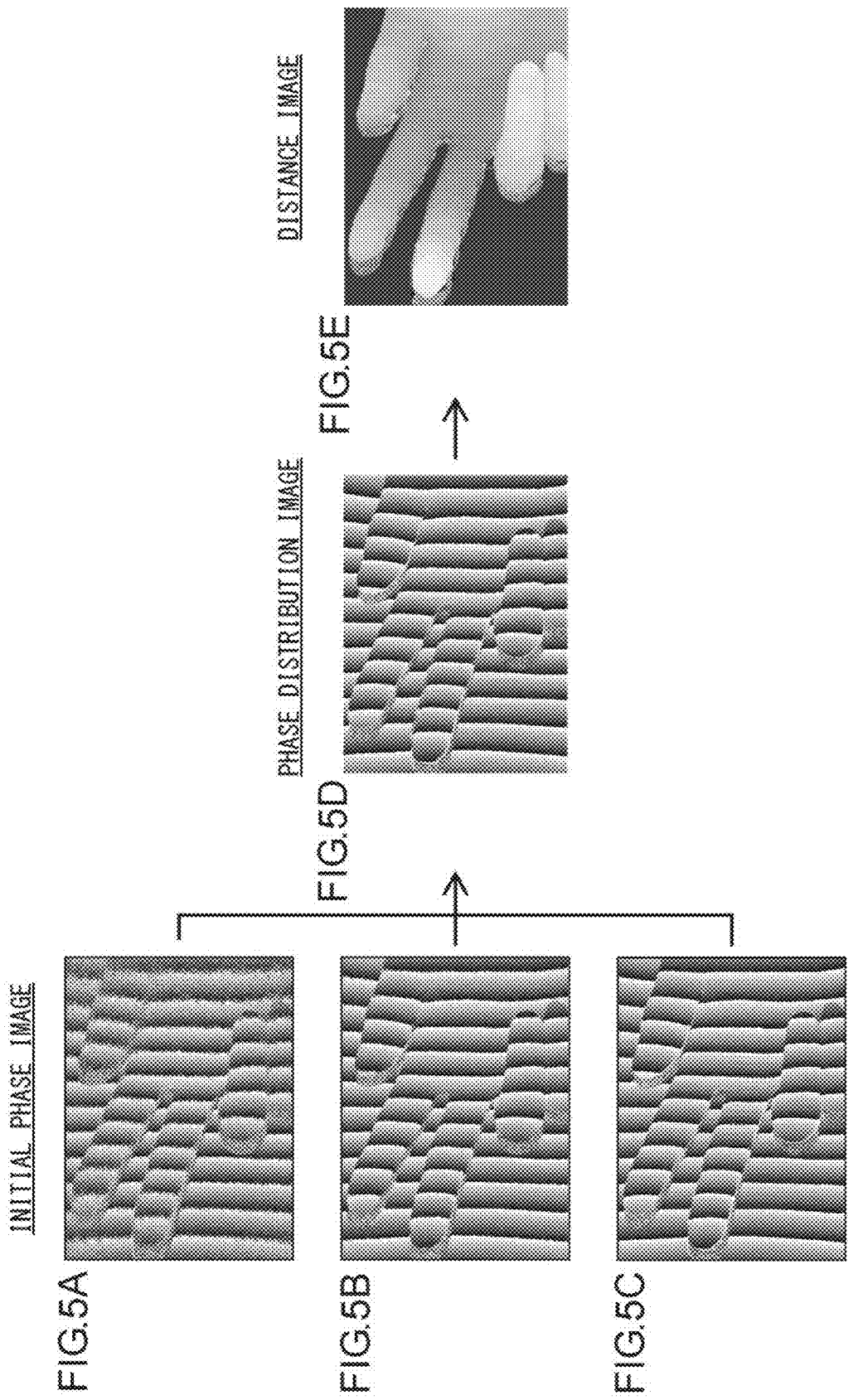

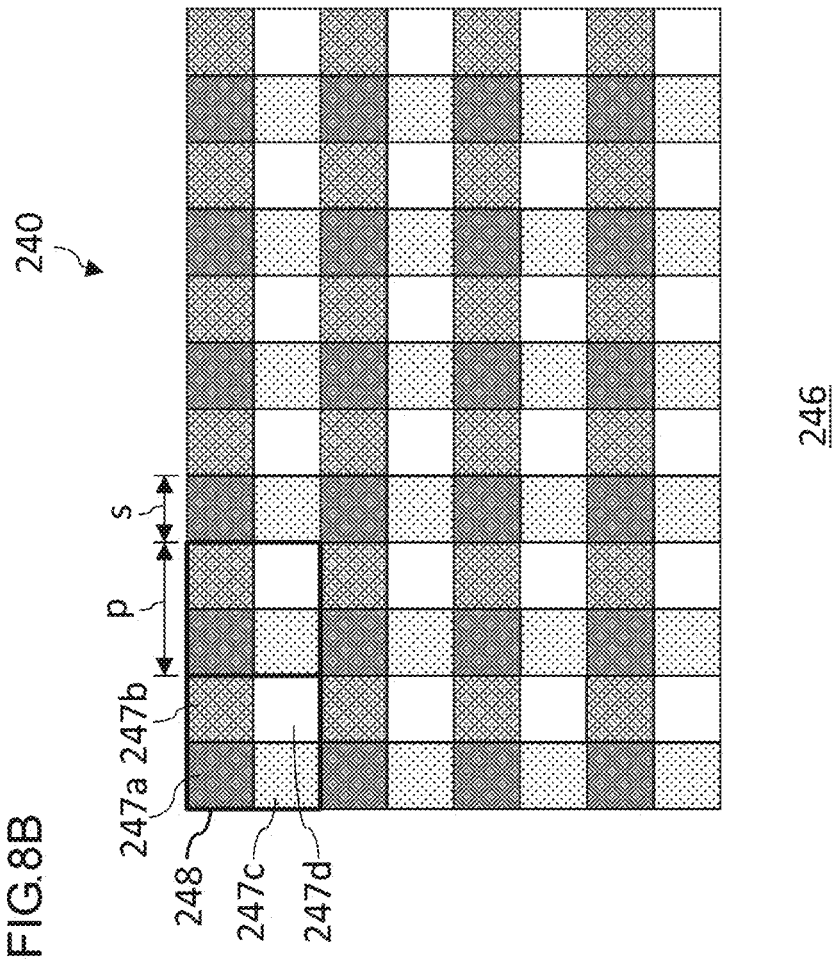
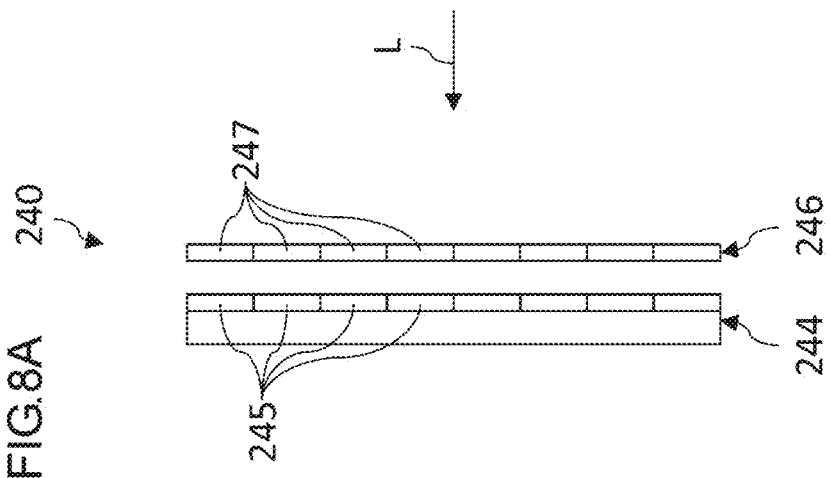

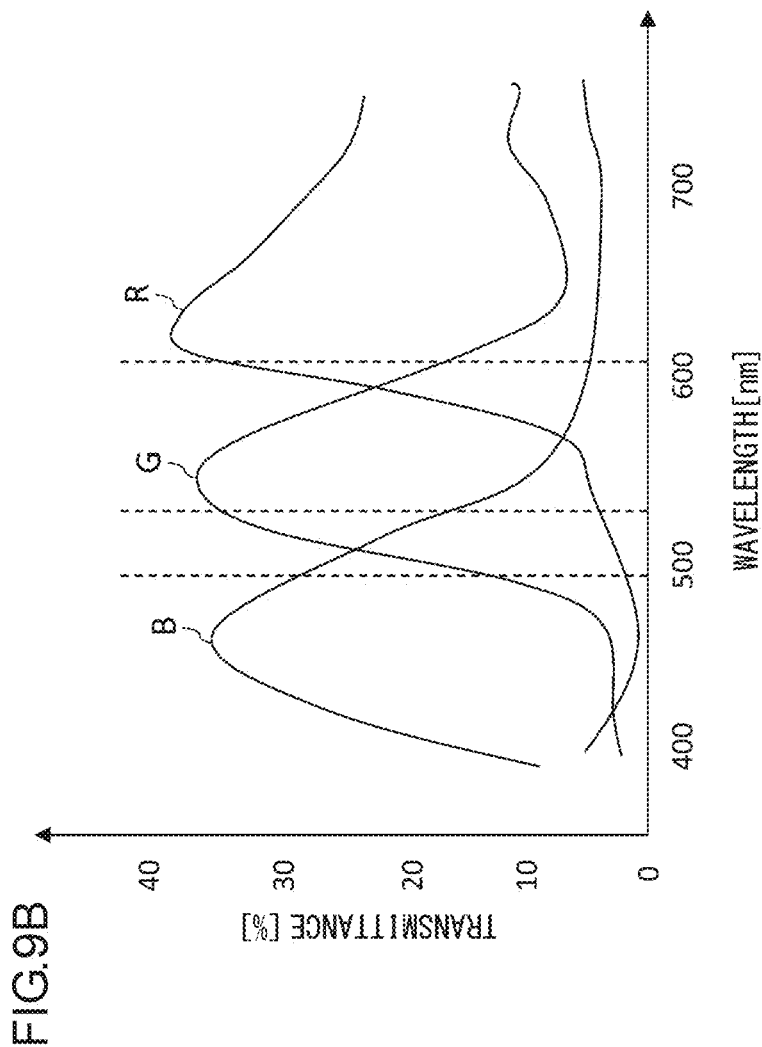

THREE-DIMENSIONAL FORM MEASUREMENT DEVICE

CROSS-REFERENCE TO RELATED APPLICATIONS

This application is based upon and claims the benefit of priority from the prior International Patent Application No. PCT/JP2016/062756, filed Apr. 22, 2016, the entire contents of which are incorporated herein by reference.

BACKGROUND

1. Field of the Invention

The present invention relates to three-dimensional form measurement devices and, more particularly, to a device for measuring the form of a subject by projecting an interference fringe.

2. Description of the Related Art

A technology called "fringe scanning", whereby asperity information on a surface of a subject is computed by projecting a laser interference fringe onto the subject and capturing and analyzing a projected image of the interference fringe, is known as a method of measuring the three-dimensional form of the subject. In fringe scanning, the depth and height of asperities at respective points in the projected image are determined from the quantity of scanning the interference fringe and variation in the light intensity at the respective points. There is also proposed a configuration to generate an interference fringe by using an incoherent light source to inhibit generation of speckle noise due to laser radiation.

In order to improve the accuracy of measuring the three-dimensional form according to fringe scanning, it is preferred to increase the contrast ratio in the interference fringe pattern and reduce the impact from speckle noise due to the light source. The use of highly coherent light to increase the contrast ratio in the interference fringe leads to an increase in speckle noise. On the other hand, the use of an incoherent light source to reduce speckle noise lowers the contrast ratio in the interference fringe pattern.

SUMMARY OF THE INVENTION

In this background, a purpose of the present invention is to provide a technology of increasing the accuracy of measurement in three-dimensional measurement devices using an interference fringe pattern.

A three-dimensional form measurement device according to an embodiment of the present invention includes: an interference fringe projector that scans an interference fringe and projects one of a plurality of interference fringe patterns that differ in dark and bright positions in the interference fringe onto a subject of measurement; an imaging device that images the subject of measurement onto which the interference fringe is projected and generates a plurality of interference fringe images corresponding to at least three different interference fringe patterns in each of a plurality of imaging conditions; and a controller that selects, for each pixel, which imaging condition, in which the interference fringe image is captured, should be used to compute a phase distribution image of the subject of measurement, based on pixel values of respective pixel in the plurality of interference fringe images captured in each of the plurality of imaging conditions and that computes a phase of each pixel in the phase distribution image based on the pixel values in the plurality of interference fringe images corresponding to the imaging condition selected for each pixel so as to compute three-dimensional form data of the subject of measurement.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4A-4C show examples of amplitude images, saturation region images, and reliability distribution images generated;

FIGS. 5A-5E show examples of an initial phase image, a phase distribution image, and a distance image generated;

FIGS. 8A and 8B schematically show a configuration of an imaging device according to another embodiment;

FIGS. 9A and 9B schematically show a configuration of the imaging device according to the variation;

FIGS. 10A, 10B, and 10C schematically show a configuration of a filter according to another embodiment;

DETAILED DESCRIPTION OF THE INVENTION

Figure 1:
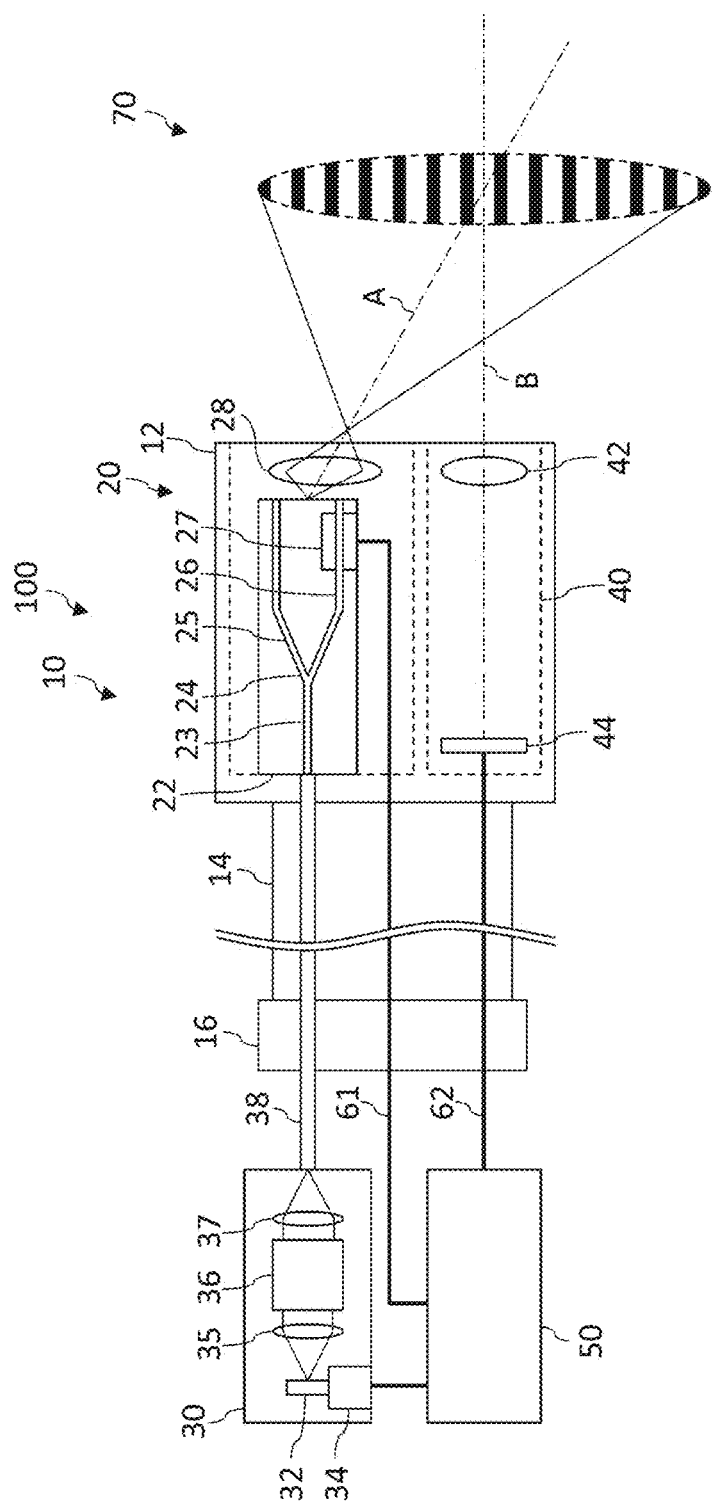
FIG. 1 schematically shows a configuration of a three-dimensional form measurement device according to an embodiment.

The invention will now be described by reference to the preferred embodiments. This does not intend to limit the scope of the present invention, but to exemplify the invention.

First, some of the embodiments according to the invention will be summarized. A three-dimensional form measurement device according to an embodiment of the present invention includes: an interference fringe projector that scans an interference fringe and projects one of a plurality of interference fringe patterns that differ in dark and bright positions in the interference fringe onto a subject of measurement; an imaging device that images the subject of measurement onto which the interference fringe is projected and generates a plurality of interference fringe images corresponding to at least three different interference fringe patterns in each of a plurality of imaging conditions; a condition selector that selects, for each pixel, which imaging condition, in which the interference fringe image is captured, should be used to compute a phase distribution image of the subject of measurement, based on pixel values of respective pixel in the plurality of interference fringe images captured in each of the plurality of imaging conditions; and a form computation unit that computes a phase of each pixel in the phase distribution image based on the pixel values in the plurality of interference fringe images corresponding to the imaging condition selected for each pixel so as to compute three-dimensional form data of the subject of measurement.

According to this embodiment, interference fringe images are acquired in a plurality of imaging conditions, and a pixel value is selected for each pixel by determining which imaging condition should be used. Accordingly, an optimum imaging condition is used for each pixel. The bright and dark areas or speckle noise occur non-uniformly in the interference fringe pattern projected onto the subject of measurement and may vary from one location to another depending on the form of the subject of measurement, the relative arrangement of the interference fringe projector, the imaging device, and the subject of measurement, etc. As a result, an imaging condition that is optimum for a certain area on the subject of measurement may not be an optimum imaging condition for another area on the subject of measurement. According to this embodiment, an imaging condition less affected by speckle noise than otherwise is selected for each pixel even when coherent light that is likely to produce speckle nose is used, by selecting a pixel value produced in an optimum imaging condition for each location. In this way, the impact from speckle noise is reduced and the accuracy of measuring the subject of measurement is increased as compared with the case of using a single imaging condition.

The plurality of imaging conditions may differ in respect of at least one of an exposure time of an imaging element provided in the imaging device, a light amount incident on the imaging element, a gain of an image signal of the imaging element, a position of the interference fringe projector with respect to the imaging device, and a light intensity of the interference fringe projected from the interference fringe projector.

The form computation unit may compute the phase of each pixel in the phase distribution image based on pixel values in the plurality of interference fringe images corresponding to the at least three different interference fringe patterns captured in the same imaging condition and on an amount of phase shift between the at least three different interference fringe patterns.

The condition selector may select for each pixel an image condition of the interference fringe image used to compute the phase distribution image based on the pixel values in the plurality of interference fringe images and a reference value determined in accordance with the number of shades of an imaging element provided in the imaging device.

The condition selector may compare the pixel values in the plurality of interference fringe images between the plurality of imaging conditions and select for each pixel an imaging condition in which the pixel value has a maximum value on a condition that the pixel value is equal to or smaller than the reference value.

The condition selector may compute for each pixel an amplitude of variation between the pixel values in the plurality of interference fringe images caused by scanning the interference fringe, based on the pixel values in the plurality of interference fringe images corresponding to the at least three different interference fringe patterns captured in the same imaging condition and on an amount of phase shift between the at least three interference fringe patterns, and selects for each pixel an imaging condition of the interference fringe image used to compute the phase distribution image based on the amplitude of variation between the pixel values computed.

The condition selector may compare the pixel values in the plurality of interference fringe images between the plurality of imaging conditions and select for each pixel an imaging condition in which the amplitude of variation between the pixel values computed has a maximum value on a condition that the pixel value is equal to or smaller than a reference value.

The condition selector may compute, for each of the plurality of imaging conditions, a reliability distribution indicating reliability of the pixel values in the plurality of interference fringe images and select for each pixel an imaging condition of the interference fringe image used to compute the phase distribution image by comparing reliability distributions computed.

The imaging device may include an imaging element and an imaging optical system for forming an image of the subject of measurement onto which the interference fringe is projected in the imaging element. A wavelength $\lambda$ of light projected by the interference fringe projector, a pitch p of a unit formed by one or a plurality of pixels of the imaging element and corresponding to one pixel in the interference fringe image, a minimum F-number of the imaging optical system at the wavelength $\lambda$, and a lateral magnification M of the imaging device at the wavelength $\lambda$ may meet the following expression (1).

$$1.22(1+M)\lambda F \leq \sqrt{2}p \quad (1)$$

The interference fringe projector may include: a light source that radiates coherent light; a branching filter that causes a light beam radiated from the light source to branch; and a phase modulator that changes a phase of at least one of light beams output by the branching filter.

The interference fringe projector may further include a light source controller that maintains a wavelength of the light beam radiated from the light source to be constant and a light modulator that modulates a light amount of the light beam radiated from the light source.

The three-dimensional form measurement device may further include a condition controller that controls an imaging condition, and the imaging device may capture the interference fringe images corresponding to the plurality of imaging conditions in a time divided manner.

The imaging device may include a plurality of imaging elements and a light path branching unit that causes an imaging light from the subject of measurement to branch toward each of the plurality of imaging elements and configures imaging conditions of the plurality of imaging elements to be different.

The imaging device may include imaging elements in which a plurality of pixels are arranged in a two-dimensional array, and each of the plurality of pixels may be configured such that at least one of an exposure time of a given pixel, a light amount incident on the given pixel, and a gain of an output signal of the given pixel differs from the exposure time, the light amount, or the gain of another of the plurality of pixels.

The imaging device may simultaneously capture interference fringe images in different imaging conditions.

The interference fringe projector may include a first interference fringe projector that projects an interference fringe pattern onto the subject of measurement from a first position and a second interference fringe projector that projects an interference fringe pattern onto the subject of measurement from a second position different from the first position.

The three-dimensional form measurement device may further include a condition controller that switches between interference fringe projection by the first interference fringe projector and interference fringe projection by the second interference fringe projector, and the imaging device may capture an interference fringe image based on the interference fringe projection by the first interference fringe projector and an interference fringe image based on the interference fringe projection by the second interference fringe projector in a time divided manner.

Another embodiment of the present invention also relates to a three-dimensional form measurement device. The device includes: an interference fringe projector that scans an interference fringe and projects one of a plurality of interference fringe patterns that differ in dark and bright positions in the interference fringe onto a subject of measurement; an imaging device including an imaging element that supports 14-bit or more shades, the imaging device imaging the subject of measurement onto which the interference fringe is projected and capturing a plurality of interference fringe images corresponding to at least three different interference fringe patterns; and a form computation unit that computes a phase distribution image of the subject of measurement based on the pixel values in the plurality of interference fringe images so as to compute three-dimensional form data of the subject of measurement.

According to this embodiment, an imaging element with a wide dynamic range of 14-bit or more shades is used. Accordingly, differences between bright and dark areas in the interference fringe pattern are imaged with a high precision even when speckle noise is generated. Accordingly, the phase distribution image is computed highly accurately.

The three-dimensional form measurement device may further include a validity determination unit that determines validity of the pixel value of each pixel in the interference fringe images, and the form computation unit may compute the phase distribution image of the subject of measurement based on a result of determination by the validity determination unit.

A description will be given of an embodiment of the present invention with reference to the drawings. In the explanations of the figures, the same elements shall be denoted by the same reference numerals, and duplicative explanations will be omitted appropriately. The configuration described below is by way of example only and does not limit the scope of the present invention.

First Embodiment

FIG. 1 schematically shows a configuration of a three-dimensional form measurement device 100 according to first embodiment. The three-dimensional form measurement device 100 includes an interference fringe projector 20, an imaging device 40, and a controller 50. The interference fringe projector 20 includes a branching filter 22, a phase modulator 27, a projection lens 28, a light source device 30, and an optical fiber 38. The three-dimensional form measurement device 100 is built in an endoscope 10 including a distal unit 12, an insertion unit 14, and a connection unit 16. For example, the three-dimensional form measurement device 100 is used to measure the three-dimensional form of a target site in the lumen by orienting the distal unit 12 toward a subject of measurement.

The distal unit 12 is a part that accommodates a portion of the interference fringe projector 20 and the imaging device 40. The outer surface of the distal unit 12 is comprised of a rigid member made of a metal or the like. The insertion unit 14 is comprised of a flexible member, and the orientation of the distal unit 12 is adjustable by bending the neighborhood of the distal unit 12. Therefore, the endoscope 10 is configured as a flexible scope, and the distal unit 12 is less flexible than the insertion unit 14. An optical fiber 38, a first wiring 61, a second wiring 62, etc. are inserted inside the insertion unit 14. The connection unit 16 is provided with, for example, a plug for connecting the endoscope 10 to the light source device 30 and the controller 50.

The interference fringe projector 20 projects an interference fringe pattern 70 onto the subject of measurement. The branching filter 22 is an optical integrated circuit formed on a silicon substrate, an optical glass substrate, etc. and generates the interference fringe pattern 70 by causing the laser beam from the light source device 30 to interfere in dual beam interference. The projection lens 28 magnifies the divergence angle of the interfering light output from the branching filter 22 to ensure that the interference fringe pattern 70 is projected onto the entirety of the subject of measurement. The projection lens 28 is placed such that the projection axis A of the interference fringe pattern 70 and the imaging axis B of the imaging device 40 intersect and the interference fringe pattern 70 is projected onto the entirety of the imaging range of the imaging device 40. For example, the projection lens 28 is placed to form an off-axis optical system where the light axis is displaced with respect to the branching filter 22. In one variation, the projection axis A of the interference fringe pattern 70 and the imaging axis B of the imaging device 40 may intersect by tilting the output axis of the branching filter 22.

The branching filter 22 includes an input path 23, a branching part 24, a first output path 25, and a second output path 26. The input path 23 is coupled to the optical fiber 38. The light input to the input path 23 is caused to branch in the branching part 24 to the first output path 25 and the second output path 26. The splitting ratio in the branching part 24 is as desired. It is preferred to split the beam at 1:1 to ensure a high contrast ratio in the interference fringe pattern 70. The first output path 25 and the second output path 26 are configured to output light from different positions. The interference fringe pattern 70 is generated by using the displacement between the positions.

The phase modulator 27 is provided in the second output path 26. The phase modulator 27 changes the refractive index of at least a portion of the second output path 26 based on a control signal from the controller 50 to change the light path length of the second output path 26. This induces a phase difference between the light output from the first output path 25 and the light output from the second output path 26 and changes bright and dark positions in the interference fringe pattern 70 projected. The configuration of the phase modulator 27 is not limited to any particular type. For example, a hot-wire heater or an electro-optic element may be used. The phase modulator 27 is electrically connected to the controller 50 via the first wiring 61.

The light source device 30 outputs coherent light for generating the interference fringe pattern 70. For example, the light source device 30 outputs a laser beam of a single wavelength. The light source device 30 includes a light source 32, a light source controller 34, a collimating lens 35, a light modulator 36, and a coupling lens 37. The light source device 30 is connected to the branching filter 22 via the optical fiber 38.

The light source 32 is a solid-state laser light source such as a semiconductor laser element. The output wavelength of the light source 32 is not limited to any particular value. For example, red light of a wavelength λ=635 nm may be used. The light source controller 34 controls the drive current, operating temperature, etc. of the light source 32 and controls the output intensity and the output wavelength of the light source 32 to be constant. The light source controller 34 may include a light receiving element and a driving element for feedback driving in accordance with the output intensity of the light source 32 and a temperature adjustment element such as Peltier element for adjusting the temperature of the light source 32. By providing the light source controller 34, the output wavelength of the light source 32 is stabilized and fluctuation in the bright and dark cycle of the interference fringe pattern 70 is inhibited.

The output light from the light source 32 is transformed into parallel light by the collimating lens 35 and is input to the light modulator 36. The light modulator 36 modulates the amount of light beam radiated from the light source 32. The configuration of the light modulator 36 is not limited to any particular type. A combination of a wavelength plate and a polarizer, or a light amount adjusting element such as a variable neutral density (ND) filter and a liquid crystal filter may be used. An optical isolator may be provided between the light source 32 and the light amount adjustment element to prevent the light from returning from the light amount adjustment element to the light source 32. By using the optical isolator, the operation of the light source 32 is stabilized and the output wavelength of the light source 32 is maintained to be constant. The light beam transmitted through the light modulator 36 is input to the optical fiber 38 via the coupling lens 37.

The interference fringe projector 20 scans the interference fringe for projection to ensure that one of a plurality of interference fringe patterns that differ in dark and bright positions is projected onto the subject of measurement. The interference fringe projector 20 adjusts the bright and dark positions in the interference fringe pattern 70 by adjusting the phase difference δ provided by the phase modulator 27. For example, the interference fringe projector 20 projects four types of interference fringe patterns 70 by configuring the phase difference δ to have values 0, π/2, π, and 3π/2. The number of types of interference fringe patterns 70 that can be projected by the interference fringe projector 20 is not limited to four, but three or five types of patterns may be projected. For example, six types of interference fringe patterns 70 may be projected by using 0, π/3, 2π/3, π, 4n/3, and 5π/3 as the phase difference δ.

The imaging device 40 images the subject of measurement onto which the interference fringe pattern 70 is projected to generate an interference fringe image. The imaging device 40 includes an imaging lens 42 and an imaging element 44. The imaging lens 42 forms an image of the subject of measurement onto which the interference fringe pattern 70 is projected on the imaging element 44. The imaging element 44 is an image sensor such as a CCD or a CMOS sensor and outputs an image signal based on the interference fringe image formed. The imaging element 44 is configured such that the exposure time, incident light amount, and the gain are adjustable. The imaging element 44 is electrically connected to the controller 50 via the second wiring 62.

The imaging device 40 is preferably configured such that the wavelength λ of the light projected by the interference fringe projector 20, the pitch p of a unit formed by a single or a plurality of pixels of the imaging element 44, the minimum F-number of the imaging device 40 (the imaging lens 42) at the wavelength λ, and the lateral magnification M of the imaging device 40 (the imaging lens 42) at the wavelength λ meet the following expression (1).

$$1.22(1+M)\lambda F \leq \sqrt{2}p \quad (1)$$

The left side of expression (1) represents the point spread function (PSF) indicating the imaging performance of the imaging device 40 and corresponds to the average speckle diameter of the speckle noise imaged by the imaging device 40. By configuring the distance $\sqrt{2}p$ of the diagonal line of the pitch p of the unit of the imaging element 44 to be larger than the average speckle diameter, the impact from speckles included in the interference fringe pattern 70 is reduced and the accuracy of measuring the interference fringe image is increased.

The pitch p of the unit of the imaging element 44 shown in expression (1) represents the pixel size corresponding to each pixel in the interference fringe image obtained as a result of imaging by the imaging device 40. In the case of determining the pixel value of one pixel in the interference fringe image from the result of light reception in one pixel of the imaging element 44, for example, the pixel size of the imaging element 44 will be the pitch p in expression (1). Meanwhile, in the case of defining a plurality of adjacent pixels of the imaging element 44 as one unit and determining the pixel value of one pixel in the interference fringe image from the result of light reception in the plurality of adjacent pixels, the size of the unit formed by the plurality of adjacent pixels will be the pitch p in expression (1).

The imaging device 40 captures interference fringe images corresponding to a plurality of imaging conditions and a plurality of interference fringe patterns in a time divided manner. The imaging device 40 captures interference fringe images in at least two different imaging conditions and captures a plurality of interference fringe images corresponding to at least three different interference fringe patterns for one imaging condition. For example, the imaging device 40 captures interference fringe images of four types of interference fringe patterns in each of three imaging conditions at different points of time, thereby generating a total of 3×4=12 interference fringe images.

Figure 2:
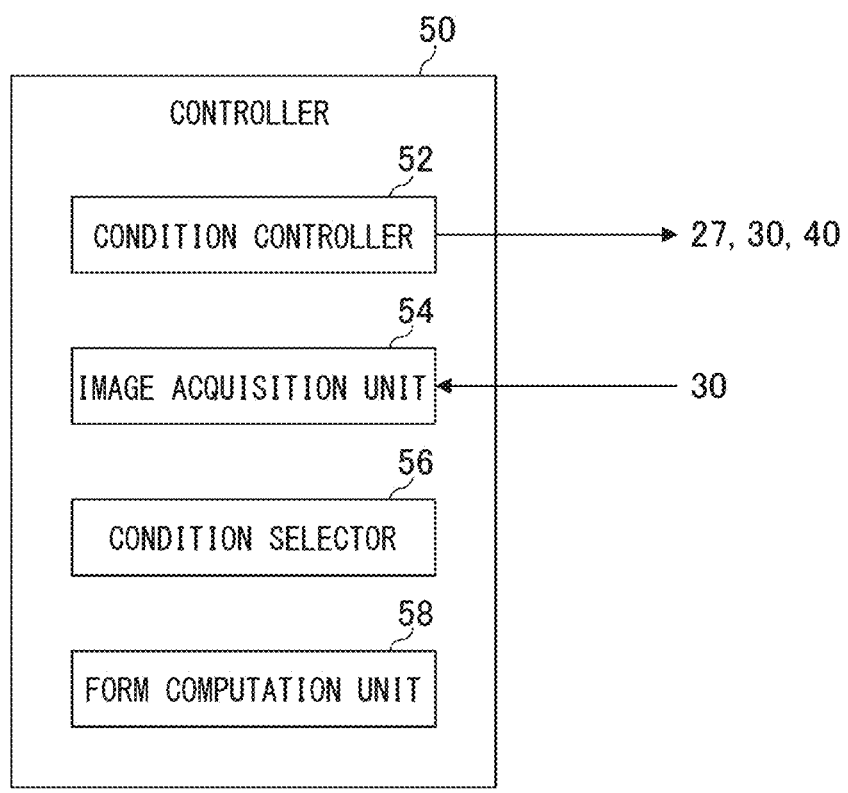
FIG. 2 is a block diagram schematically showing a functional configuration of the controller.

FIG. 2 is a block diagram schematically showing a functional configuration of the controller 50. The controller 50 includes a condition controller 52, an image acquisition unit 54, a condition selector 56, and a form computation unit 58. The blocks shown in FIG. 2 can be implemented in hardware such as devices or mechanical components exemplified by a Central Processing Unit (CPU) of a computer, and in software such as a computer program. FIG. 2 depicts functional blocks implemented by the cooperation of these elements. Therefore, it will be understood by those skilled in the art reading this specification that the functional blocks may be implemented in a variety of manners by a combination of hardware and software.

The condition controller 52 controls a phase condition related to the interference fringe pattern 70 projected onto the subject of measurement and an imaging condition related to the interference fringe image captured by the imaging device 40. The condition controller 52 controls the type of interference fringe pattern 70 projected onto the subject of measurement by controlling the operation of the phase modulator 27. The condition controller 52 controls the imaging condition (i.e., the exposure condition) of the interference fringe image by controlling the light amount of the laser beam output from the light source device 30, the exposure time, the incident light amount, and the gain of the imaging element 44, etc. Thus, the condition controller 52 allows the imaging device 40 to capture interference fringe images under a plurality of imaging conditions. The condition controller 52 may operate the light source device 30 or the imaging device 40 based on predefined operating parameters. Alternatively, the condition controller 52 may adjust the operating parameter of the light source device 30 or the imaging device 40 based on the image captured by the imaging device 40.

The image acquisition unit 54 acquires the interference fringe image from the imaging device 40. The image acquisition unit 54 acquires a plurality of interference fringe images corresponding to at least three different interference fringe patterns captured in each of a plurality of imaging conditions. When four types of interference fringe patterns are used for three types of imaging conditions, for example, the image acquisition unit 54 acquires a total of 3×4=12 interference fringe images.

Figure 3A:
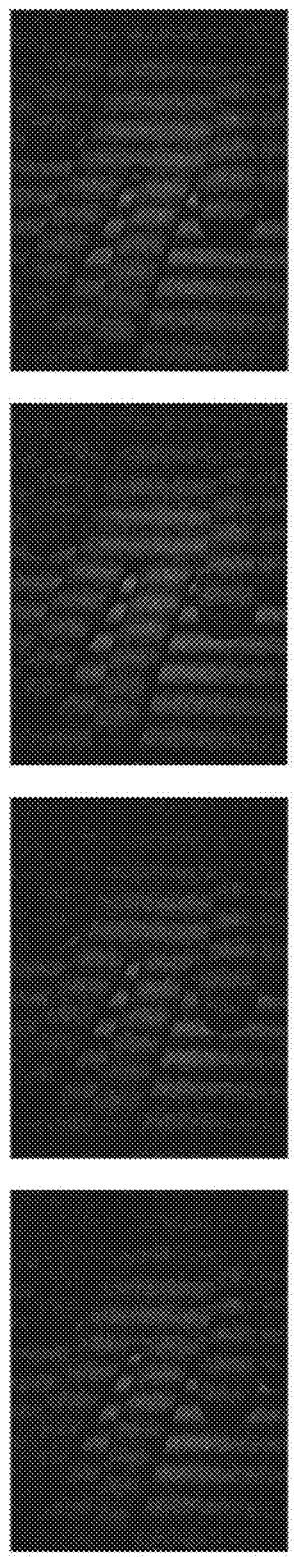
FIGS. 3A-3C show examples of interference fringe images acquired.
Figure 3B:
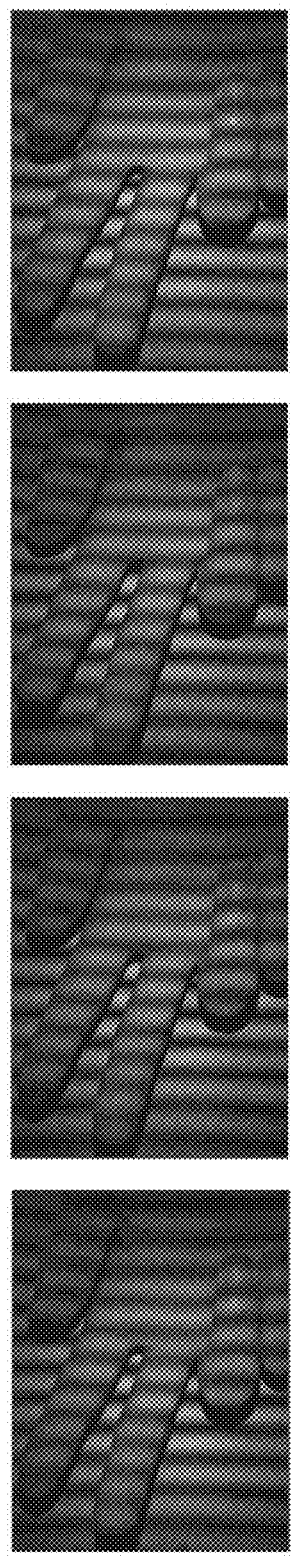
Figure 3C:
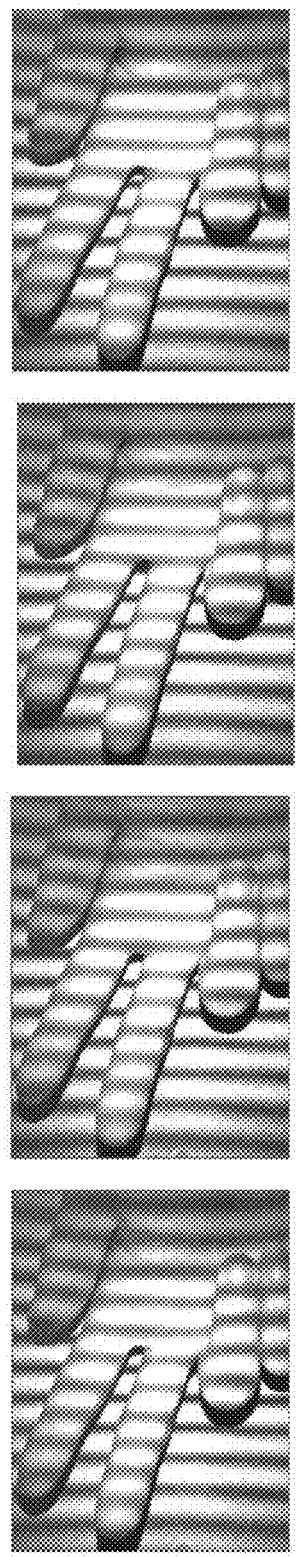

FIGS. 3A-3C show examples of interference fringe images acquired and show 3×4=12 examples of interference fringe images. The figures show images of different interference fringe patterns in the horizontal direction and show images of different imaging conditions in the vertical direction. FIG. 3A shows interference fringe images in a first imaging condition, which corresponds to a relatively dark exposure condition. FIG. 3B shows interference fringe images in a second imaging condition, which corresponds to an intermediate exposure condition. FIG. 3C shows interference fringe images in a third imaging condition, which corresponds to a relatively bright exposure condition. In the illustrated example, the exposure condition is adjusted to ensure that the exposure light amount is such that A:B:C=1:2:4.

The condition selector 56 selects, for each pixel, which imaging condition, in which the interference fringe image is captured, should be used to compute the initial phase of the subject of measurement, based on the pixel values of the pixels in the interference fringe images acquired by the image acquisition unit 54. Stated otherwise, an optimum imaging condition is determined for each pixel in the interference fringe image. A pixel value is determined for each pixel by determining which imaging condition that the pixel value should be based. When interference fringe images captured in three types of imaging conditions are acquired, for example, the pixel value based on the first imaging condition may be employed for a given pixel, and the pixel value based on the second imaging condition, different from the first imaging condition, may be employed for another pixel, and the third imaging condition, different from the first imaging condition or the second imaging condition, may be employed for a still another pixel.

The condition selector 56 generates, as reference values used in selecting a condition, an "amplitude image" and a "saturation region image", based on a plurality of interference fringe images corresponding to a plurality of interference fringe patterns imaged in the same imaging condition. An "amplitude image" represents image visualization of the amount of change in the pixel values of the pixels in the interference fringe images caused by the change in the interference fringe pattern 70. The pixel value $I_A$ of each pixel in the amplitude image is computed based on the following expression (2).

$$I_A = \sqrt{\left(\sum_{i=1}^{n} I_i \cos\delta_i\right)^2 + \left(\sum_{i=1}^{n} I_i \sin\delta_i\right)^2} \quad (2)$$

Referring to expression (2), $I_i$ denotes the pixel value of each pixel in the interference fringe image, $\delta_i$ denotes the phase difference $\delta$ of the corresponding interference fringe pattern, and the suffix i corresponds to the type of interference fringe pattern. In this embodiment, the suffixes i=1, 2, 3, 4, and $\delta_1=0$, $\delta_2=\pi/2$, $\delta_3=\pi$, $\delta_4=3\pi/2$. Instead of $I_A$, $I_A^2$ may be used as the pixel value in the amplitude image. In the latter case, finding a square root in expression (2) is not necessary.

A "saturation region image" is an image showing a region where the pixel value saturates due to the incidence of light amount in the interference fringe image that exceeds the number of shades of the imaging element 44. The pixel value $I_s$ of each pixel in the saturation region image is computed based on the following expression (3).

$$I_S = \begin{cases} 0 & \text{if } \dfrac{\sum I_i}{n} > a(2^b - 1), \\ 1 & \text{if } \dfrac{\sum I_i}{n} \le a(2^b - 1) \end{cases} \quad (3)$$

Referring to expression (3), $I_i$ denotes the pixel value of each pixel in the interference fringe image, the suffix i corresponds to the type of interference fringe pattern, n denotes the number of types (e.g., four) of reference fringe patterns, a denotes a constant to determine a threshold value, and b denotes the number shades of the imaging element 44. In this embodiment, the value of constant a is set such that a=0.8~0.9. The number of shades b of the imaging element 44 may be, for example, 12. Expression (3) shows that the pixel value $I_s$ in the saturation region image will be 0 when the average of the pixel values in the interference fringe image exceeds a predetermined reference value and saturation is considered to occur. $I_s$ will be 1 when the average of the pixel values in the interference fringe image is equal to or lower than the predetermined reference value and saturation is not considered to occur.

The pixel value $I_S$ in the saturation region image may be computed based on an alternative criterion. For example, the pixel value $I_S$ may be defined to be 0 when, of the pixel values in a plurality of interference fringe images corresponding to a plurality of interference fringe patterns, the pixel value corresponding to at least one pattern saturates (e.g., $I_i \le 2^b - 1$). The pixel value $I_S$ may be defined to be 1 when none of the pixel values corresponding to the plurality of patterns saturate (e.g., $I_i \le 2^b - 1$).

The condition selector 56 generates a "reliability distribution image" from the amplitude image and the saturation region image generated as described above. The pixel value $I_T$ in the reliability distribution image is computed as a product ($I_T = I_A \times I_S$) of the pixel value $I_A$ of each pixel in the amplitude image and the pixel value $I_S$ of each pixel in the saturation region image. Therefore, the pixel value $I_T$ in the reliability distribution image will be 0 for the pixel for which the pixel value in the saturation region image is 0 and will be equal to the pixel value $I_A$ in the amplitude image for the pixel for which the pixel value in the saturation region image is 1. The condition selection unit 56 generates the amplitude image, saturation region image, and reliability distribution image for each of the plurality of imaging conditions.

FIGS. 4A-4C show examples of amplitude images, saturation region images, and reliability distribution images generated. FIG. 4A shows images in the first imaging condition, FIG. 4B shows images in the second imaging condition, and FIG. 4C shows images in the third imaging conditions. As shown in FIG. 4A, which represents a dark exposure condition, the amplitudes of pixel values are small on the whole and no saturating pixels are found. Meanwhile, in FIG. 4C, which represents a bright exposure condition, saturating pixels are found near the center of the image and the amplitudes of pixel values are small in the saturation region. On the other hand, in FIG. 4C, the amplitudes of pixel values in a peripheral region are relatively large, where pixel values do not saturate. In FIG. 4B, which represents an intermediate exposure condition, no saturating pixels are found, the amplitudes of pixel values near the center of the image are relatively large, but the amplitudes of pixel values in the peripheral region of the image are relatively small.

In the fringe scanning method according to this embodiment, it is preferable to detect the brightness and darkness in the interference fringe pattern properly, which requires that the difference between brightness and darkness at each pixel caused by the difference in the type of interference fringe patterns, i.e., the amplitudes of pixel values in the interference fringe image are sufficiently large and the imaging element 44 does not saturate. In the reliability distribution image described above, the pixel value of pixels that saturate is defined to be 0, and the pixel value of pixels that do not saturate is defined to be equal to the amplitude in the interference fringe images. It can therefore be said that the pixel value of each pixel in the reliability distribution image is an indicator indicating the validity of each pixel in the interference fringe image and that the larger the pixel value, the higher the validity. Thus, the condition selector 56 compares pixel values in the reliability distribution image to see a difference between imaging conditions, thereby determining a proper pixel for each pixel by determining which imaging condition that the pixel value should be based. The condition selector 56 compares pixel values in three reliability distribution images corresponding to three types of imaging conditions and determines for each pixel which imaging condition produces the largest pixel value.

The form computation unit 58 computes a phase distribution image of the subject of measurement and computes three-dimensional form data of the subject of measurement from the phase distribution image. The form computation unit 58 computes a pixel value (an initial phase $\varphi$) in the phase distribution image from the pixel value in a plurality of interference fringe images corresponding to a plurality of interference fringe patterns imaged in the same imaging condition. The form computation unit 58 computes the initial phase $\varphi$ of each pixel by using pixel values in the interference fringe images captured in the imaging condition determined by the condition selector 56 for each pixel. The initial phase $\varphi$ in the phase distribution image is computed based on the following expression (4).

$$\varphi = \tan^{-1}\left(\frac{-\sum_{i=1}^{n} I_i \sin\delta_i}{\sum_{i=1}^{n} I_i \cos\delta_i}\right) \quad (4)$$

FIGS. 5A-5E show examples of an initial phase image, a phase distribution image, and a distance image generated. FIG. 5A shows an initial phase image generated from the interference fringe image in the first imaging condition, FIG. 5B shows an initial phase image generated from the interference fringe image in the second imaging condition, and FIG. 5C shows an initial phase image generated from the interference fringe image in the third imaging condition. The form computation unit 58 generates the phase distribution image shown in FIG. 5D by selecting the pixel value (the initial phase $\varphi$) of one of the three types of initial phase images shown in FIGS. 5A-5C in accordance with the determination by the condition selector 56. The pixel value (the initial phase $\varphi$) of each pixel in the phase distribution image of FIG. 5D is equal to the initial phase $\varphi$ computed from the interference fringe images in the imaging condition determined by the condition selector 56. The form computation unit 58 computes information related to the depth and height on the surface of the subject of measurement corresponding to the position of each pixel by applying a known algorithm to the phase distribution image generated, thereby generating the distance image shown in FIG. 5E. The form computation unit 58 may compute spatial coordinates of the subject of measurement and generate stereoscopic form data like three-dimensional computer aided design (CAD) data instead of the distance image.

The form computation unit 58 may generate three types of initial phase images shown in FIGS. 5A-5C and then generate the phase distribution image shown in FIG. 5D. Alternatively, the form computation unit 58 may generate the phase distribution image shown in FIG. 5D directly from the interference fringe images shown in FIGS. 3A-3C without generating the initial phase images shown in FIGS. 5A-5C. In the latter case, it is not necessary to compute the initial phase $\varphi$ for all pixels in the three initial phase images. The initial phase $\varphi$ may be computed for each pixel in one phase distribution image. Therefore, the volume of computational process required to generate the phase distribution image is reduced.

Figure 6:
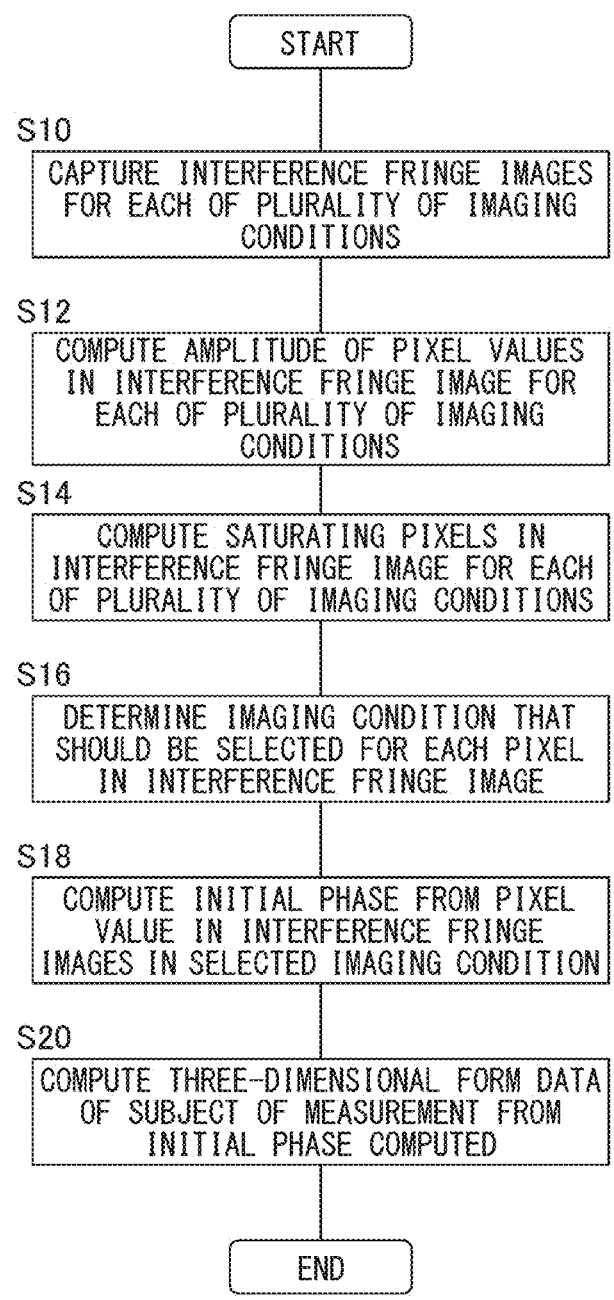
FIG. 6 is a flowchart showing the flow of operation of the three-dimensional form measurement device.

FIG. 6 is a flowchart showing the flow of operation of the three-dimensional form measurement device 100. The imaging device 40 captures a plurality of interference fringe images corresponding to a plurality of interference fringe patterns in a plurality of imaging conditions (S10). The condition selector 56 computes the amplitudes of pixel values in the interference fringe images for each of the plurality of imaging conditions (S12) and computes saturating pixels in the interference fringe images for each of the plurality of imaging conditions (S14). The condition selector 56 determines for each pixel the imaging condition that should be selected, based on the amplitudes of pixel values and the saturating pixels in the interference fringe images (S16). The form computation unit 58 computes the initial phase from the pixel values of interference fringe images in the imaging condition selected by the condition selector 56 to generate the phase distribution image (S18) and computes three-dimensional form data of the subject of measurement from the initial phase computed (S20).

According to the embodiment, interference fringe images are acquired in a plurality of imaging conditions, and a pixel value is selected for each pixel by determining which imaging condition should be used. Accordingly, an optimum imaging condition is used for each pixel. In particular, the interference fringe images are evaluated based on the amplitudes of pixel values and the saturating pixels in the interference fringe images. More specifically, the maximum amplitude and the non-saturating pixel value are selected (identified) for each pixel. The phase distribution image is generated by combining the pixel values acquired in the optimum imaging condition. Accordingly, an imaging condition less affected by speckle noise than otherwise is selected for each pixel even when coherent light that is likely to produce speckle nose is used. In this way, the impact from speckle noise is reduced and the accuracy of measuring the subject of measurement is increased as compared with the case of using only a single imaging condition.

In one variation, the condition selector 56 may determine an imaging condition that should be selected for each pixel based only on one of the amplitudes of pixel values and saturating pixels in interference fringe images.

In another variation, the phase modulator may be provided in both the first output path 25 and the second output path 26 instead of providing the phase modulator 27 only in the second output path 26 of the branching filter 22.

In still another variation, a branching filter in which a birefringent element or a beam splitter is used may be used in place of the branching filter 22 in which an optical integrated circuit is used.

Second Embodiment

Figure 7:
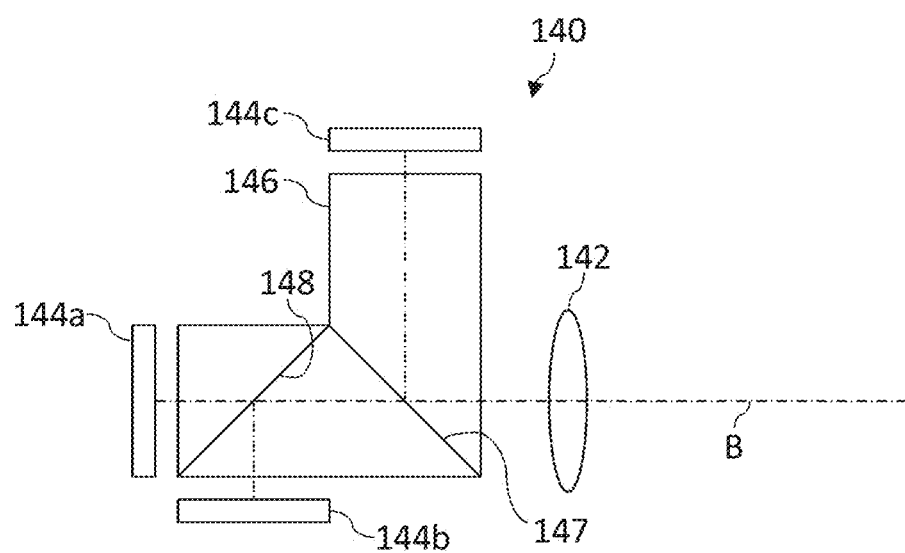
FIG. 7 schematically shows a configuration of an imaging device according to another embodiment.

FIG. 7 schematically shows a configuration of an imaging device 140 according to the embodiment. The second embodiment differs from the first embodiment in that the imaging device 140 including a plurality of imaging elements is provided in place of the imaging device 40 described above. A description will be given of the second embodiment, highlighting a difference from the first embodiment.

The imaging device 140 includes an imaging lens 142, a first imaging element 144a, a second imaging element 144b, a third imaging element 144c, and a light path branching unit 146. The light path branching unit 146 causes the light incident on the imaging lens 142 along the imaging axis B to branch, causing a projected image of an interference fringe pattern to be imaged on each of the plurality of imaging elements 144a, 144b, and 144c. The light path branching unit 146 is formed by, for example, adhesively bonding three prisms.

The light path branching unit 146 includes a first light branching plane 147 and a second light branching plane 148. The first light branching plane 147 causes the light transmitted through the imaging lens 142 to branch to a light path extending in the direction of the first imaging element 144a and the second imaging element 144b and to a light path extending in the direction of the third imaging element 144c. The second light branching plane 148 causes the light transmitted through the first light branching plane 147 to branch to a light path extending in the direction of the first imaging element 144a and a light path extending in the direction of the second imaging element 144b.

The first light branching plane 147 is configured to cause the light incident on the first light branching plane 147 to branch at a ratio of 3:4, ensuring that the proportion of the light traveling toward the first imaging element 144a and the second imaging element 144b is 3 and the proportion of the light traveling toward the third imaging element 144c is 4. The second light branching plane 147 is configured to cause the light incident on the second light branching plane 148 to branch at a ratio of 1:2, ensuring that the light traveling toward the first imaging element 144a is 1 and the proportion of the light traveling toward the second imaging element 144b is 2. In this way, the light branching unit 146 ensures that the light amount incident on the first imaging element 144a, the second imaging element 144b, and the third imaging element 144c is in a proportion 1:2:4 so that the imaging conditions of the respective imaging elements differ.

The first imaging element 144a captures an interference fringe image in a first imaging condition corresponding to a dark exposure condition, the second imaging element 144b captures an interference fringe image in a second imaging condition corresponding to an intermediate exposure condition, and the third imaging element 144c captures an interference fringe image in a third imaging condition corresponding to a bright exposure condition. The imaging device 140 transmits the interference fringe images captured by the first imaging element 144a, the second imaging element 144b, and the third imaging element 144c to the controller 50.

According to the configuration described above, the imaging device 140 is capable of simultaneously capturing interference fringe images corresponding to different imaging conditions in the same composition. In other words, a plurality of interference fringe images can be captured in different imaging conditions only by imaging the subject of measurement onto which a given interference fringe pattern is projected once. Therefore, as compared with the case of the first embodiment, the imaging device 140 according to this embodiment is capable of reducing the time required to acquire all types of (e.g., 12) interference fringe images corresponding to a plurality of imaging conditions and a plurality of interference fringe patterns. In the case where the surface form of the subject of measurement varies over time, for example, measurement errors caused by variation in form can be reduced.

In one variation, an alternative method may be used to realize simultaneous imaging in a plurality of imaging conditions instead of implementing a plurality of imaging conditions by using a splitting ratio defined by the first light branching plane 147 and the second light branching plane 148 of the light path branching unit 146. For example, the amount of light split by the light path branching unit 146 and traveling toward the first imaging element 144a, the second imaging element 144b, and the third imaging element 144c may be configured to be in a proportion 1:1:1, and, at the same time, the imaging conditions of the respective imaging elements may be made different by disposing ND filters that differ in the transmittance in front of the respective imaging elements. Alternatively, the imaging conditions of the respective imaging elements may be made different by configuring the exposure time or gain of the respective imaging elements to be different. Still alternatively, the imaging conditions of the respective imaging elements may be made different by combining desired methods capable of adjusting imaging conditions, such as ND filters placed in front of the respective imaging elements, the exposure time or gain of the respective imaging elements, etc., capable of adjusting the imaging condition.

In one variation, a light source capable of outputting polychromatic light in which a plurality of colors (e.g., red, green, blue) are mixed may be used as the light source device 30 of the interference fringe projector 20. The light branching unit of the imaging device 140 may split the incident light according to the wavelength so that the wavelength of light incident on the respective imaging elements may differ. For example, the branching unit may cause red light to be incident on the first imaging element 144a, green light on the second imaging element 144b, and blue light on the third imaging element 144c. The imaging conditions of the respective imaging elements may be configured to differ in this way. In this case, the image acquisition unit 54 may use image signals acquired from the plurality of imaging elements 144a, 144b, and 144c to generate color images of the subject of measurement.

Third Embodiment

FIGS. 8A and 8B schematically show a configuration of an imaging device 240 according to the third embodiment. The imaging device 240 includes an imaging element 244 and a filter 246. In this embodiment, it is ensured to acquire interference fringe images corresponding to a plurality of imaging conditions using a single imaging element 244 by causing the light transmittance to be different between cells 247 of the filter 246. A description will now be given of the third embodiment, highlight a difference from the foregoing embodiments.

The imaging element 244 includes a plurality of pixels 245 arranged in a two-dimensional array. The filter 246 includes a plurality of cells 247 arranged in a two-dimensional array to correspond to the respective pixels 245. The filter 246 is an ND filter. The transmittance of the cells is defined such that the transmittance for light L incident on the respective pixels 245 differs. As shown in FIG. 8B, the filter 246 includes four types of cells 247a, 247b, 247c, and 247d (generically referred to as cells 247) that differ in the transmittance. The adjacent four types of cells 247a~247d form one unit 248. A plurality of units 248 are arranged in a two-dimensional array in the filter 246. The transmittance of the cells 247 are such that the transmittance of the first cell 247a is 12.5%, the transmittance of the second cell 247b is 25%, the transmittance of the third cell 247c is 50%, and the transmittance of the fourth cell 247d is 100%.

The pixel 245 corresponding to the first cell 247a generates a pixel value in an interference fringe image in the first imaging condition, which represents a dark exposure condition. The pixel 245 corresponding to the second cell 247b generates a pixel value in an interference fringe image in the second imaging condition, which represents a slightly dark exposure condition. The pixel 245 corresponding to the first cell 247c generates a pixel value in an interference fringe image in the third imaging condition, which represents a slightly bright exposure condition. The pixel 245 corresponding to the first cell 247d generates a pixel value in an interference fringe image in the fourth imaging condition, which represents a bright exposure condition.

The image acquisition unit 54 generates four interference fringe images captured in different imaging conditions based on the image signal acquired from the imaging element 244. The image acquisition unit 54 generates an interference fringe image in the first imaging condition from the pixel value, in the image signal, of the pixel 245 corresponding to the first cell 247a. Similarly, the image acquisition unit 54 generates an interference fringe image in the second imaging condition from the pixel value, in the image signal, of the pixel 245 corresponding to the second cell 247b, generates an interference fringe image in the third imaging condition from the pixel value of the pixel 245 corresponding to the third cell 247c, and generates an interference fringe image in the fourth imaging condition from the pixel value of the pixel 245 corresponding to the fourth cell 247d.

As in the foregoing embodiments, although the plurality of interference fringe images corresponding to the plurality of imaging conditions generated in this way differ from each other in the imaging condition, the positions of imaging the respective pixels differ between imaging conditions, strictly speaking. To describe it more specifically, the pixel 245 corresponding to the first cell 247a is used in the first imaging condition, but the pixel 245 corresponding to the second cell 247b adjacent to the first cell 247a is used in the second imaging condition. To increase the accuracy of measuring the subject of measurement, it is preferred to capture the subject of measurement onto which the interference fringe pattern is projected substantially at the same position regardless of the difference in the position of the pixel 245 of the imaging element 244 dependent on the imaging condition. In other words, it is preferred to image substantially the same position of the subject of measurement, whichever of the plurality of pixels 245 corresponding to the single unit 248 is used. The condition to achieve this is given by the following expression (5) by using the PSF of the imaging optical system.

$$s < 1.22(1+M)\lambda F \quad (5)$$

where s on the left side of expression (5) denotes the size of the pixel 245, and the right side denotes the PSF given by expression (1). By configuring the size of the pixel 245 to be smaller than the PSF, it is ensured that the light incident on a given pixel 245 and the light incident on the adjacent pixel 245 are substantially identical.

It is also preferred that the size p of the unit 248 meets expression (1) to reduce the impact from speckle noise. In other words, it is preferred that the average speckle diameter is smaller than the length $\sqrt{2}p$ of the diagonal line of the unit 248. This reduces the difference in the proneness to produce a speckle between different units 248 and increases the likelihood that a proper light amount (i.e., the light amount producing the largest amplitude to the extent that saturation does not occur) is incident on a given pixel 245 included in the unit 248. As a result, the accuracy of detecting the initial phase φ at each pixel is increased.

In one variation, the unit 245 may not be provided to correspond to four pixels 245. For example, one unit may be provided for three pixels 245, or one unit may be provided for six or eight pixels 245. Alternatively, one unit may not be formed by a plurality of adjacent pixels. Every second or third of a plurality of pixels may be included in one unit.

In another variation, a plurality of interference fringe images corresponding to a plurality of imaging conditions may be acquired simultaneously by configuring the plurality of pixels 245 corresponding to the unit 248 to differ in the exposure time or gain, instead of configuring the cells 247 of the filter 246 to differ in the transmittance.

In still another variation, the cells 247 may be configured to differ in the transmittance for a specific wavelength by using a color filter, instead of using an ND filter as the filter 246. For example, a color filter having a Bayer arrangement of red (R), green (G), and blue (B) may be used, and a laser beam of the specific wavelength, for which there is a graded difference in transmittance between the filters of the respective colors, may be used to generate the interference fringe pattern 70.

FIGS. 9A and 9B schematically show a configuration of the imaging device 240 according to the variation. As shown in FIG. 9A, the filter 246 forms a Bayer arrangement of red (R), green (G), and blue (B). R and G are alternately arranged on odd lines, and G and B are arranged on even lines. FIG. 9B is a graph showing the transmittance of the red (R), green (G), and blue (B) filters. As illustrated, the transmittance of the filters of the respective colors is such that R:G:B≈4:2:1 at the wavelength near λ=600 nm. By using a wavelength for which there is a graded difference in the transmittance between the filters of the respective colors in this way, the same advantage as provided by using ND filters that differ in the transmittance can be provided by using a color filter as the filter 246.

A wavelength other than the wavelength near λ=600 nm may be used as the specific wavelength. For example, the fact that the transmittance of the filters of the respective colors is such that R:G:B≈1:4:2 at a wavelength near λ=530 nm in the color filter having the property shown in FIG. 9b may be taken advantage of. Alternatively, the fact that the transmittance of the filters of the respective colors is such that R:G:B≈1:4:8 near λ=500 nm may be taken advantage of.

Fourth Embodiment

FIGS. 10A, 10B, and 10C schematically show a configuration of a filter 346 according to the fourth embodiment. As shown in FIG. 10A, the filter 346 according to this embodiment forms a Bayer arrangement of red (R), green (G), and blue (B). R and G are alternately arranged on odd lines, and G and B are arranged on even lines. Further, six cells 347 of the filter 346 form a unit 348a and a unit 348b (hereinafter, generically referred to as units 348). The green (G) cells included in the same unit 348 differ from each other in the transmittance, which allows interference fringe images to be acquired in different imaging conditions. A description will now be given of the fourth embodiment, highlighting a difference from the foregoing embodiments.

FIG. 10B schematically shows a configuration of a first unit 348a. The first unit 348a is comprised of a first cell 347a of red (R), a second cell 347b of green (G), a third cell 347c of green (G), a fourth cell 347d of blue (B), a fifth cell 347e of red (R), and a sixth cell 347f of green (G). Of these cells, the second cell 347b of green (G) and the third cell 347c of green (G) are provided with an ND filter as well as a color filter. For example, the second cell 347b is provided with an ND filter having a transmittance of 25%, and the third cell 347c is provided with an ND filter having a transmittance of 50%. The sixth cell 347f of green (G) has a transmittance of 100%.

FIG. 10C schematically shows a configuration of the second unit 348b. The second unit 348b is comprised of a seventh cell 347g of green (G), an eighth cell 347h of blue (B), a ninth cell 347i of red (R), a tenth cell 347j of green (G), an eleventh cell 347k of green (G), and a twelfth cell 371 of blue (B). Of these cells, the seventh cell 347g of green (G) and the tenth cell 347j of green (G) are provided with an ND filter as well as a color filter. For example, the seventh cell 347g is provided with an ND filter having a transmittance of 25%, and the tenth cell 347j is provided with an ND filter having a transmittance of 50%. The eleventh cell 347k of green (G) has a transmittance of 100%.

As shown in FIG. 10a, the first unit 348a and the second unit 348b are alternately arranged in the vertical direction. The first units 348a are arranged in the horizontal direction, and the second units 348b are also arranged in the horizontal direction. In this way, the repetition of 2×2 cells realizes a Bayer arrangement of R, G, and B, and, at the same time, the repetition of units comprised of 2×3 cells ensures that green cells of three types of transmittance (e.g., 25%, 50%, and 100%) are arranged periodically.

The image acquisition unit 54 generates a color image of the subject of measurement or interference fringe images corresponding to three imaging conditions, based on the image signal acquired from the imaging device 340 provided with the filter 346. The image acquisition unit 54 generates a color image of the subject of measurement by processing the image signal based on the Bayer arrangement of R, G, and B of the filter 346. In this process, the image acquisition unit 54 may generate a color image by correcting the pixel value corresponding to the green cell by allowing for the transmittance of the green cell (G). For example, the image acquisition unit 54 may correct the pixel value corresponding to the cell of a transmittance of 25% by quadrupling the pixel value and correct the pixel value corresponding to the cell of a transmittance of 50% by doubling the pixel value. Alternatively, the image acquisition unit 54 may compute the pixel values of the respective pixels corresponding to the green cells (G) by, for example, averaging the pixel values of the green (G) cells that differ in the transmittance.

The image acquisition unit 54 generates interference fringe images corresponding to three imaging conditions by using the pixel values corresponding to the green (G) cells. The image acquisition unit 54 generates an interference fringe image in the first imaging condition, which represents a dark exposure condition, by arranging the pixel values of the cells corresponding to the second cell 347b and the seventh cell 347g having a transmittance of 25%. The image acquisition unit 54 generates an interference fringe image in the second imaging condition, which represents an intermediate exposure condition, by arranging the pixel values of the cells corresponding to the third cell 347c and the tenth cell 347j having a transmittance of 50%. The image acquisition unit 54 generates an interference fringe image in the third imaging condition, which represents a bright exposure condition, by arranging the pixel values of the cells corresponding to the sixth cell 347f and the twelfth cell 347l having a transmittance of 100%.

The number of pixels in the color image generated by the image acquisition unit 54 does not need to match the number of pixels in each of the interference fringe images corresponding to the respective imaging conditions. The image acquisition unit 54 may generate a color image for which the number of pixels matches that of the imaging element of the imaging device 340 and generate an interference fringe image for which the number of pixels is ⅙ that of the imaging element of the imaging device 340. In one variation, a color image having the same number of pixels as that of the interference image may be generated.

The interference fringe projector 20 may project an interference fringe pattern of a green (e.g., the wavelength λ=532 nm) laser beam instead of a red (e.g., the wavelength λ=635 nm) laser beam. In other words, a laser beam having a wavelength for which the transmittance of the green (G) cell of the filter 346 is high may be used in this embodiment. This increases the contrast ratio in the interference fringe pattern detected by the pixels corresponding to the green (G) cells and increases the accuracy of measuring the stereoscopic form of the subject of measurement.

In another variation, the unit 348 may be comprised of a different number of cells 347. For example, interference fringe images corresponding to four imaging conditions may be simultaneously acquired by configuring the unit 348 to include 2×4=8 cells and configuring the four green (G) cells included in the unit 348 to differ in the transmittance.

Fifth Embodiment

In the foregoing embodiments, a determination is made as to which imaging condition should be used to compute the initial phase of each pixel, based on interference fringe images corresponding to a plurality of imaging conditions, and the initial phase of each pixel is computed from the interference fringe image in the imaging condition thus determined. This embodiment differs from the foregoing embodiments in that the initial phase of each pixel is computed based on interference fringe images corresponding to a single imaging condition. A description will be given of this embodiment, highlighting a difference from the foregoing embodiments.

Figure 11:
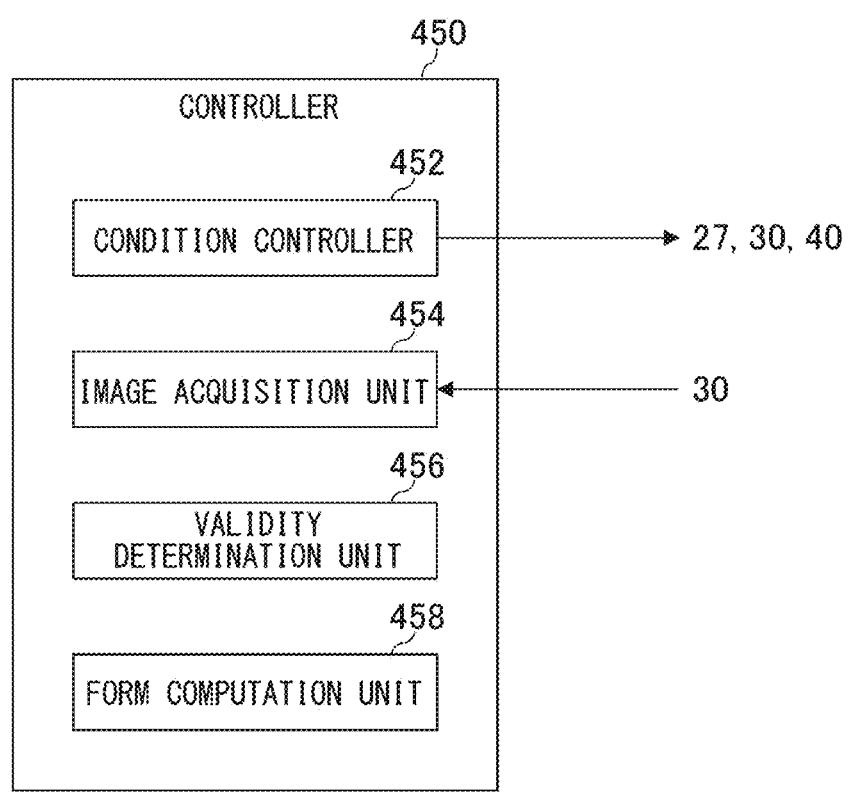
FIG. 11 is a block diagram schematically showing a functional configuration of a controller according to another embodiment.

FIG. 11 is a block diagram schematically showing a functional configuration of a controller 450 according to the fifth embodiment. The controller 450 includes a condition controller 452, an image acquisition unit 454, a validity determination unit 456, and a form computation unit 458. The controller 450 according to this embodiment includes the validity determination unit 456 in place of the condition selector 56.

The condition controller 452 controls the operation of the phase modulator 27 to ensure that one of a plurality of interference fringe patterns is projected onto the subject of measurement. The condition controller 452 also controls the light amount of the light source device 30, the exposure time and gain of the imaging element 44, etc. so that the imaging device 40 can capture interference fringe images under desired imaging conditions. The condition controller 452 controls the exposure condition so that no saturating pixels are contained in the interference fringe image captured by the imaging device 40 or the number of saturating pixels is smaller than a predetermined reference value.

The image acquisition unit 454 acquires a plurality of interference fringe images corresponding to a plurality of interference fringe patterns from the imaging device 40. The validity determination unit 456 determines the validity of each pixel in the interference fringe image acquired by the image acquisition unit 454. Like the condition selector 56 of the embodiment described above, for example, the validity determination unit 456 generates a "reliability distribution image" from an "amplitude image" and a "saturation region image" and determines the validity of each pixel based on the pixel value of each pixel in the reliability distribution image. The validity determination unit 456 determines the pixel to be valid when the pixel value in the reliability distribution image is equal to or larger than a predetermined threshold value and determines the pixel value to be invalid when the pixel value is smaller than the predetermined threshold value.

The form computation unit 458 computes a phase distribution image of the subject of measurement based on the result of determination by the validity determination unit 456. The form computation unit 458 computes the initial phase of the pixel value determined by the validity determination unit 456 to be valid based on pixel values in a plurality of interference fringe images and defines a value indicating an error (e.g., null) to be the pixel value of the pixel in the phase distribution image determined by the validity determination unit 456 to be invalid. The form computation unit 458 may compute the initial phase of the pixel determined to be invalid by interpolating the initial phase values of adjacent pixels.

The imaging device 40 according to this embodiment includes an imaging element 44 that supports a large number of shades. For example, the imaging element 44 supports 14-bit or more shades. For example, by using a 14-bit image sensor as the imaging element 44 and by adjusting the exposure condition so that the pixels of the imaging element 44 do not saturate, interference fringe images equivalent to those obtained by using a 12-bit image sensor and configuring the exposure amount to be ½ and ¼ can be obtained. As a result, the accuracy equivalent to that of the case of combining interference fringe images in a plurality of imaging conditions to generate a phase distribution image can be obtained by capturing interference fringe images based on a single imaging condition. Accordingly, this embodiment is equally capable of realizing high-precision three-dimensional form measurement.

Sixth Embodiment

Figure 12:
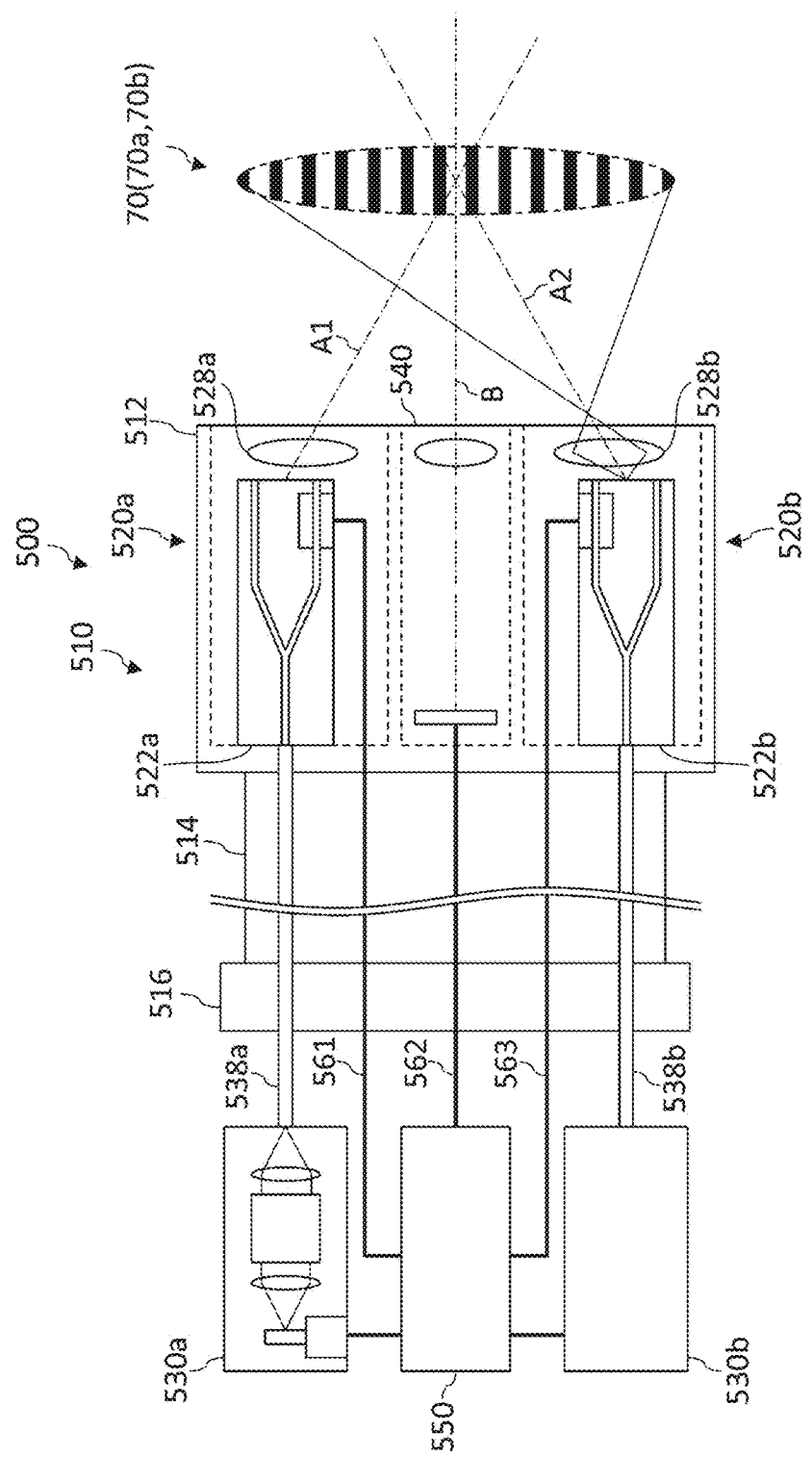
FIG. 12 schematically shows a configuration of a three-dimensional form measurement device according to another embodiment.

FIG. 12 schematically shows a configuration of a three-dimensional form measurement device 500 according to the sixth embodiment. The three-dimensional form measurement device 500 includes a first interference fringe projector 520a, a second interference fringe projector 520b, an imaging device 540, and a controller 550. The first interference fringe projector 520a includes a first branching filter 522a, a first projection lens 528a, and a first light source device 530a. The second interference fringe projector 520a includes a second branching filter 522b, a second projection lens 528b, and a second light source device 530b. This embodiment differs from the foregoing embodiments in that a plurality of interference fringe projectors for projecting the interference fringe pattern 70 are provided. A description will be given of this embodiment, highlighting a difference from the foregoing embodiments.

The three-dimensional form measurement device 500 is built in an endoscope 510 including a distal unit 512, an insertion unit 514, and a connection unit 516. The first branching filter 522a, the first projection lens 528a, the second branching filter 522b, the second projection lens 528b, and the imaging device 540 are built in the distal unit 512. A first optical fiber 538a, a second optical fiber 538b, a first wiring 561, a second wiring 562, and a third wiring 563 are inserted in the insertion unit 514.

The first optical fiber 538a connects the first branching filter 522a and the first light source device 530a, and the second optical fiber 538b connects the second branching filter 522b and the second light source 530b. The first wiring 561 connects the first branching filter 522a and the controller 550, the second wiring 562 connects the imaging device 540 and the controller 550, and the third wiring 563 connects the second branching filter 522b and the controller 550.

The first interference fringe projector 520a and the second interference fringe projector 520b are configured like the interference fringe projector 20 described above but projects the interference fringe pattern 70 from different positions with respect to the imaging device 540. The first interference fringe projector 520a is configured to project the interference fringe pattern 70 from the first position, and the second interference fringe projector 520b is configured to project the interference fringe pattern 70 from the second position different from the first position. As a result, the projection axis A1 of the first interference fringe projector 520a, the projection axis A2 of the second interference fringe projector 520b, and the imaging axis B of the imaging device 540 are arranged to intersect each other.

The first interference fringe projector 520a and the second interference fringe projector 520b may be arranged at positions that are symmetrical to each other across the imaging device 540 or the imaging axis B of the imaging device 540. For example, the first interference fringe projector 520a and the second interference image projector 520b may be arranged such that the projection axis A1 of the first interference fringe projector 520a, the projection axis A2 of the second interference fringe projector 520b, and the imaging axis B of the imaging device 540 are on the same plane. The first interference fringe projector 520a and the second interference fringe projector 520b may generate the interference fringe pattern 70 so that the direction of extension of the fringe of the interference fringe pattern 70 is orthogonal to the plane including the projecting axes A1, A2 and the imaging axis B.

The first interference fringe projector 520a and the second interference fringe projector 520b may generate the interference fringe pattern 70 by using laser beams of the same wavelength or generate the interference fringe pattern 70 by using laser beams of different wavelengths. In the former case, the first light source device 530a and the second light source device 530b may be substantially the same light source device. In the latter case, the first light source device 530a and the second light source device 530b may be light source devices that output laser beams having different wavelengths. In one variation, the first interference fringe projector 520a and the second interference fringe projector 520b may share a single light source device instead of providing the two light source devices 530a and 530b.

The controller 550 causes the first interference fringe projector 520a or the second interference fringe projector 520b to project the interference fringe pattern 70 and causes the imaging device 540 to image the subject of measurement onto which the interference fringe pattern 70 is projected. The controller 550 controls the imaging condition for the interference fringe image by switching between the interference fringe projectors 520a and 520b used to project the interference fringe pattern 70. The controller 550 causes the imaging device 540 to image the subject of measurement onto which a first interference fringe pattern 70a based on the first interference fringe projector 520a is projected to acquire the interference fringe image in the first imaging condition. Further, the controller 550 causes the imaging device 540 to image the subject of measurement onto which a second interference fringe pattern 70b based on the second interference fringe projector 520b is projected to acquire the interference fringe image in the second imaging condition. The controller 550 ensures that the interference fringe image according to the first imaging condition and the interference fringe image according to the second imaging condition are acquired in a time divided manner.

The controller 550 causes interference fringe images corresponding to a plurality of types of first interference fringe patterns 70a based on the first interference fringe projector 520a to be imaged, by controlling the phase condition of the first branching filter 522a. More specifically, four types of first interference fringe patterns 70a are projected such that the values of the phase difference δ induced by the first branching filter 522a are 0, π/2, π, 3π/2 to acquire the interference fringe images in the first imaging condition corresponding to the respective first interference fringe patterns 70a. Similarly, the controller 550 causes interference fringe images corresponding to a plurality of types of second interference fringe patterns 70b based on the second interference fringe projector 520b to be imaged, by controlling the phase condition of the second branching filter 522b. More specifically, four types of second interference fringe patterns 70b are projected such that the values of the phase difference δ induced by the second branching filter 522b are 0, π/2, π, 3π/2 to acquire the interference fringe images in the second imaging condition corresponding to the respective second interference fringe patterns 70b.

The controller 550 generates "reliability distribution images" based on the acquired interference fringe images. The controller 550 generates a reliability distribution image according to the first imaging condition from the interference fringe images based on the four types of first interference fringe patterns 70a that differ in the phase difference δ and generates a reliability distribution image according to the second imaging condition from the interference fringe images based on the four types of second interference fringe patterns 70b that differ in the phase difference δ. The controller 50 compares the reliability distribution images according to the first imaging condition and the second imaging condition and determines a proper pixel for each pixel by determining which imaging condition that the pixel value should be based. The controller 550 computes the initial phase φ of each pixel from the plurality of types of interference fringe images corresponding to the imaging condition determined for each pixel and generates an initial phase image of the subject of measurement.

The controller 550 uses different computing methods to compute the spatial coordinates of the subject of measurement from the initial phase φ computed from the plurality of interference fringe images based on the first interference fringe pattern 70a and to compute the spatial coordinates of the subject of measurement from the initial phase φ computed from the plurality of interference fringe images based on the second interference fringe pattern 70b. This is because the relative arrangement of the first interference fringe projector 520a and the imaging device 540 differs from the relative arrangement of the second interference fringe projector 520b and the imaging device 540. Even when interference fringe patterns from different positions of projection are used, the controller 550 can compute the spatial coordinates of the subject of measurement properly by applying an algorithm adapted to the relative arrangement of the interference fringe projector 520a, 520b and the imaging device 540.

According to this embodiment, it is possible to use a plurality of interference fringe images projected from different positions of projection and employ interference fringe images based on a more suitable position of projection for each pixel. Accordingly, an initial phase image having an accordingly higher accuracy can be generated. The speckle pattern of laser is determined by the relative arrangement of the interference fringe projector, the imaging device, and the subject of measurement. Therefore, the measurement result affected by small speckle noise can be obtained for each pixel by combining a plurality of positions of projection. Further, even when a shadow portion onto which the interference fringe pattern is not projected is created due to the stereoscopic form of the subject of measurement, a shadow-free measurement result can be obtained for each pixel by projecting the interference fringe pattern from a plurality of directions. In other words, the pixel at a position onto which the interference fringe is not projected from one of the positions of projection can be complemented by using the result of imaging the interference fringe projected from the other position of projection. In this embodiment, the condition for each pixel is determined based on the reliability distribution image. Therefore, a measurement result less affected by speckle noise or shadow than otherwise can be selected and a highly accurate and reliable initial phase image can be generated.

In one variation, three or more interference fringe projectors may be used to acquire interference fringe images based on interference fringe patterns projected from three or more positions of projection. In this case, the plurality of interference fringe projectors may be arranged to surround the projection axis B of the imaging device 540. The three or more interference fringe projectors may be configured such that the interval between the fringes of the interference fringe pattern is identical or different.

In another variation, the interference fringe images based on the interference fringe patterns from different positions of projection may be acquired simultaneously instead of acquiring them in a time divided manner. For example, the interference fringe patterns projected by a plurality of interference fringe projectors may be configured to differ in the wavelength so that the interference fringe images based on the interference fringe patterns projected from different positions of projection may be captured simultaneously by isolating the wavelengths of the light incident on the imaging device. In this case, the imaging device 140 according to the second embodiment, the imaging device 240 according to the third embodiment, etc. may be used as the imaging device.

Described above is an explanation based on an exemplary embodiment. The embodiment is intended to be illustrative only and it will be understood by those skilled in the art that various modifications to constituting elements and processes could be developed and that such modifications are also within the scope of the present invention.

Figure 13:
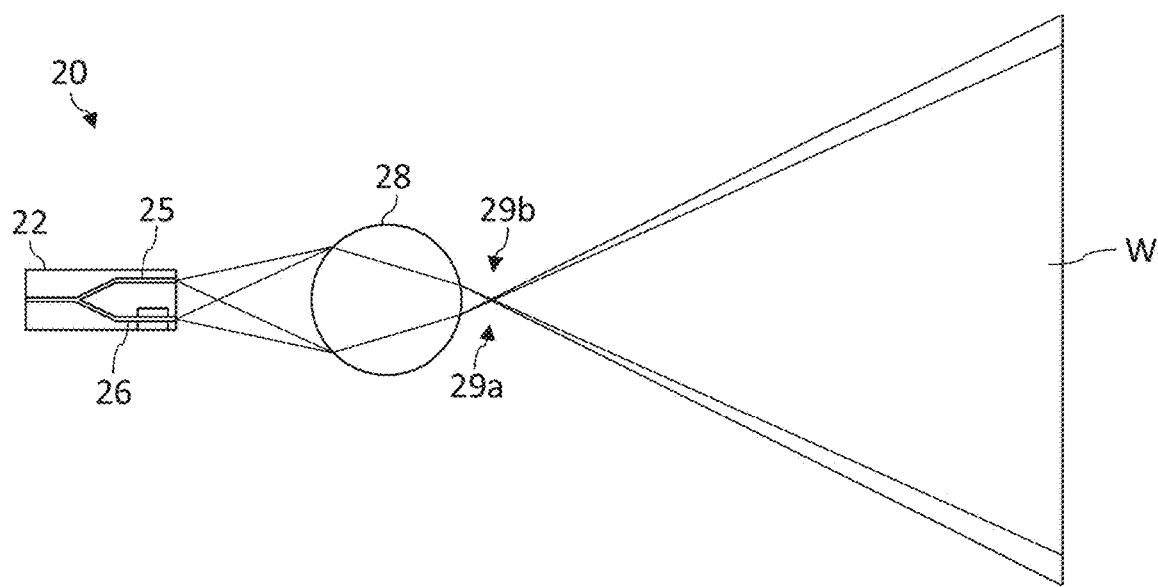
FIG. 13 schematically shows a configuration of the interference fringe projector according to a variation.

FIG. 13 schematically shows a configuration of the interference fringe projector 20 according to a variation. This variation differs from the embodiments described above in that a ball lens is used as the projection lens 28 in place of the plano-convex lens. The projection lens 28 focuses the light beam output from the first output path 25 on a first focal point 29a and focuses the light beam output from the second output path 26 on a second focal point 29b. In a region W where the light beam diverged from the first focal point 29a and the light beam diverged from the second focal point 29b overlap, the light beams interfere to generate the interference fringe pattern 70. Therefore, the same advantage as provided by the foregoing embodiments is provided by using the ball lens as the projection lens 28.

In one variation, a concave lens may be used as the projection lens 28 in place of the plano-convex lens, or the projection lens 28 may be comprised of a combination of a plurality of lenses at least including a concave lens or a convex lens.

In another variation, only the information related to the depth and height on the surface of the subject of measurement may be computed instead of the spatial coordinates of the subject of measurement. Further, a desired value related to the spatial coordinates of the subject of measurement may be used to display information related to the spatial coordinates of the subject of measurement in a desired mode.

In the embodiments described above, the three-dimensional form measurement device is depicted as a flexible endoscope. In one variation, the endoscope may be a hard scope in which the insertion unit is configured not to be flexible. The endoscope device may be used in medical applications or industrial applications. The three-dimensional form measurement device according to the embodiments may not be built in an endoscope.

It should be understood that the invention is not limited to the above-described embodiment but may be modified into various forms on the basis of the spirit of the invention. Additionally, the modifications are included in the scope of the invention.

What is claimed is:

1. A three-dimensional form measurement device comprising:
    an interference fringe projector that scans an interference fringe and projects N interference fringe patterns that differ in dark and bright positions in the interference fringe onto a subject of measurement, where N is a natural number larger than 2;
    an imaging device that includes an image sensor and that images the subject of measurement onto which the interference fringe is projected under M different imaging conditions, and generates N*M interference fringe images corresponding to the N different interference fringe patterns in each of the M different imaging conditions, where M is a natural number larger than 1; and
    a controller that:
        selects, for each pixel in a phase distribution image of the subject of measurement which is to be computed, one of the M different imaging conditions; and
        computes a phase of each pixel in the phase distribution image based on pixel values in N of the N*M interference fringe images imaged under the one of the M different imaging conditions selected for each pixel so as to compute three-dimensional form data of the subject of measurement.

2. The three-dimensional form measurement device according to claim 1, wherein the M different imaging conditions differ in respect of at least one of an exposure time of the image sensor provided in the imaging device, a light amount incident on the image sensor, a gain of an image signal of the image sensor, a position of the interference fringe projector with respect to the imaging device, and a light intensity of the interference fringe projected from the interference fringe projector.

3. The three-dimensional form measurement device according to claim 1, wherein the controller computes the phase of each pixel in the phase distribution image based on the pixel values in the plurality of N of the N*M interference fringe images corresponding to the N different interference fringe patterns imaged under the same imaging condition and based on an amount of phase shift between the N different interference fringe patterns.

4. The three-dimensional form measurement device according to claim 1, wherein the controller selects said one of the M different imaging conditions for each pixel in the phase distribution image based on the pixel values in the N*M interference fringe images and a reference value determined in accordance with a number of shades of the image sensor provided in the imaging device.

5. The three-dimensional form measurement device according to claim 4, wherein the controller compares the pixel values in the N*M interference fringe images between the M different imaging conditions and selects, as said one of the M different imaging conditions for each pixel, an imaging condition in which the pixel value has a maximum value on a condition that the pixel value is equal to or smaller than the reference value.

6. The three-dimensional form measurement device according to claim 1, wherein the controller computes for each pixel an amplitude of variation between the pixel values in the N*M interference fringe images caused by scanning the interference fringe, based on the pixel values in N of the N*M the interference fringe images corresponding to the N different interference fringe patterns captured in the same imaging condition and on an amount of phase shift between the N different interference fringe patterns, and selects said one of the M different imaging conditions for each pixel in the phase distribution image based on the amplitude of variation between the pixel values computed.

7. The three-dimensional form measurement device according to claim 6, wherein the controller compares the pixel values in the N*M interference fringe images between the M different imaging conditions and selects, as said one of the M different imaging conditions for each pixel, an imaging condition in which the amplitude of variation between the pixel values computed has a maximum value on a condition that the pixel value is equal to or smaller than a reference value determined in accordance with the number of shades of the image sensor provided in the imaging device.

8. The three-dimensional form measurement device according to claim 1, wherein the controller computes, for each of the M different imaging conditions, a reliability distribution indicating reliability of the pixel values in the N of the N*M interference fringe images imaged under the same imaging condition, and selects said one of the M different imaging conditions for each pixel by comparing reliability distributions computed.

9. The three-dimensional form measurement device according to claim 1, wherein the imaging device includes the image sensor and an imaging optical system including a lens for forming an image of the subject of measurement onto which the interference fringe is projected in the image sensor,
wherein a wavelength λ of light projected by the interference fringe projector, a pitch p of a unit formed by one or a plurality of pixels of the image sensor and corresponding to one pixel in the interference fringe image, a minimum F-number of the imaging optical system at the wavelength λ, and a lateral magnification M of the imaging device at the wavelength λ meet the following expression (1)

$$1.22(1+M)\lambda F \leq \sqrt{2}p \qquad (1).$$

10. The three-dimensional form measurement device according to claim 1, wherein the interference fringe projector includes:
a light source that radiates coherent light;
a branching filter that causes a light beam radiated from the light source to branch; and
a phase modulator that changes a phase of at least one of light beams output by the branching filter.

11. The three-dimensional form measurement device according to claim 10, wherein the interference fringe projector further includes a light source controller that maintains a wavelength of the light beam radiated from the light source to be constant and a light modulator that modulates a light amount of the light beam radiated from the light source.

12. The three-dimensional form measurement device according to claim 1, wherein the imaging device captures the N*M interference fringe images corresponding to the M different imaging conditions in a time divided manner.

13. The three-dimensional form measurement device according to claim 1, wherein the imaging device includes a plurality of image sensors and a light path branching unit that includes a prism and that causes an imaging light from the subject of measurement to branch toward each of the plurality of sensors and configures imaging conditions of the plurality of image sensors to be different.

14. The three-dimensional form measurement device according to claim 13, wherein the imaging device simultaneously captures interference fringe images in different imaging conditions.

15. The three-dimensional form measurement device according to claim 1, wherein:
the image sensor includes a plurality of pixels arranged in a two-dimensional array, and each of the plurality of pixels is configured such that at least one of an exposure time of a given pixel, a light amount incident on the given pixel, and a gain of an output signal of the given pixel differs from the exposure time, the light amount, or the gain of another of the plurality of pixels.

16. The three-dimensional form measurement device according to claim 1, wherein the interference fringe projector includes a first interference fringe projector that projects an interference fringe pattern onto the subject of measurement from a first position and a second interference fringe projector that projects an interference fringe pattern onto the subject of measurement from a second position different from the first position.

17. The three-dimensional form measurement device according to claim 16, wherein:
the controller switches between interference fringe projection by the first interference fringe projector and interference fringe projection by the second interference fringe projector, and
the imaging device captures an interference fringe image based on the interference fringe projection by the first interference fringe projector and an interference fringe image based on the interference fringe projection by the second interference fringe projector in a time divided manner.

* * * * *